US012573062B2

(12) United States Patent
Akahori

(10) Patent No.: US 12,573,062 B2
(45) Date of Patent: Mar. 10, 2026

(54) IMAGE PROCESSING METHOD, IMAGE PROCESSING DEVICE, PROGRAM, AND TRAINED MODEL

(71) Applicant: FUJIFILM Corporation, Tokyo (JP)

(72) Inventor: Sadato Akahori, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 402 days.

(21) Appl. No.: 18/064,281

(22) Filed: Dec. 11, 2022

(65) Prior Publication Data

US 2023/0206477 A1     Jun. 29, 2023

(30) Foreign Application Priority Data

Dec. 27, 2021     (JP) ................................. 2021-212816

(51) Int. Cl.
*G06T 7/33* (2017.01)

(52) U.S. Cl.
CPC ...... *G06T 7/33* (2017.01); *G06T 2207/20081* (2013.01); *G06T 2207/20084* (2013.01); *G06T 2207/30004* (2013.01)

(58) Field of Classification Search
None
See application file for complete search history.

(56) References Cited

U.S. PATENT DOCUMENTS

2018/0025548 A1     1/2018   Endo et al.
2019/0057505 A1*    2/2019   Pheiffer ................ G06T 7/0016

2019/0311549 A1    10/2019   Endo et al.
2020/0090345 A1*    3/2020   Krebs .................. A61B 5/7267
2020/0160972 A1*    5/2020   Bériault .................. G06T 15/06
2020/0311923 A1*   10/2020   Walton ...................... G06T 3/18
2021/0233645 A1*    7/2021   Morard ................. G06T 7/0014
2022/0051416 A1*    2/2022   Cao ...................... G06T 7/0012

(Continued)

FOREIGN PATENT DOCUMENTS

CN          113052882         6/2021
JP          2018011637        1/2018

(Continued)

OTHER PUBLICATIONS

Koen A.J. Eppenhof et al., "Pulmonary CT Registration through Supervised Learning with Convolutional Neural Networks," IEEE Transactions on Medical Imaging, Oct. 2018, pp. 1-10.

(Continued)

*Primary Examiner* — Leon Viet Q Nguyen
(74) *Attorney, Agent, or Firm* — JCIPRNET

(57)     ABSTRACT

Provided are an image processing method, an image processing device, a program, and a trained model that can suppress calculation resources required for registration between a plurality of images.
An image processing method that is executed by one or more processors includes: allowing the one or more processors to acquire feature maps of each of a plurality of images; and allowing the one or more processors to calculate a deformation vector field from a combination of the feature maps of each image. The one or more processors generate the feature maps respectively from the plurality of images using a first neural network and input the generated combination of the feature maps to a second neural network to calculate the deformation vector field.

13 Claims, 19 Drawing Sheets

(56) References Cited

U.S. PATENT DOCUMENTS

| | | | |
|---|---|---|---|
| 2022/0351494 A1 | 11/2022 | Kaneko | |
| 2023/0126640 A1* | 4/2023 | Novosad | A61B 5/7267 |
| | | | 382/128 |

FOREIGN PATENT DOCUMENTS

| | | |
|---|---|---|
| JP | 2023522527 | 5/2023 |
| WO | 2021085057 | 5/2021 |

OTHER PUBLICATIONS

Yabo Fu et al., "Deep Learning in Medical Image Registration: A Review," arXiv:1912.12318v1, Dec. 2019, pp. 1-32.
"Office Action of Japan Counterpart Application", issued on May 23, 2025, with English translation thereof, pp. 1-6.
"Office Action of Japan Counterpart Application", issued on Aug. 21, 2025, with English translation thereof, p. 1-p. 5.

* cited by examiner

FIG. 9

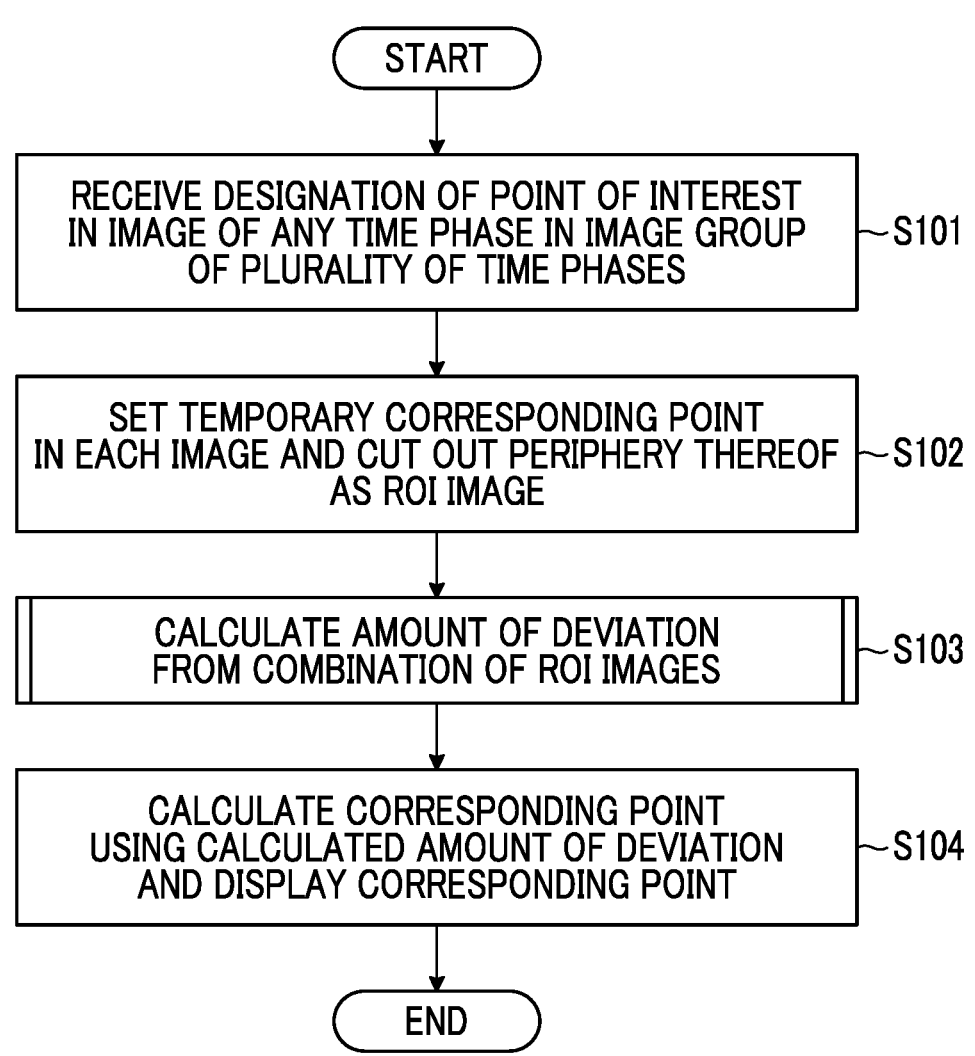

START

RECEIVE DESIGNATION OF POINT OF INTEREST
IN IMAGE OF ANY TIME PHASE IN IMAGE GROUP
OF PLURALITY OF TIME PHASES     ~S101

SET TEMPORARY CORRESPONDING POINT
IN EACH IMAGE AND CUT OUT PERIPHERY THEREOF     ~S102
AS ROI IMAGE

CALCULATE AMOUNT OF DEVIATION
FROM COMBINATION OF ROI IMAGES     ~S103

CALCULATE CORRESPONDING POINT
USING CALCULATED AMOUNT OF DEVIATION     ~S104
AND DISPLAY CORRESPONDING POINT

END

FIG. 16

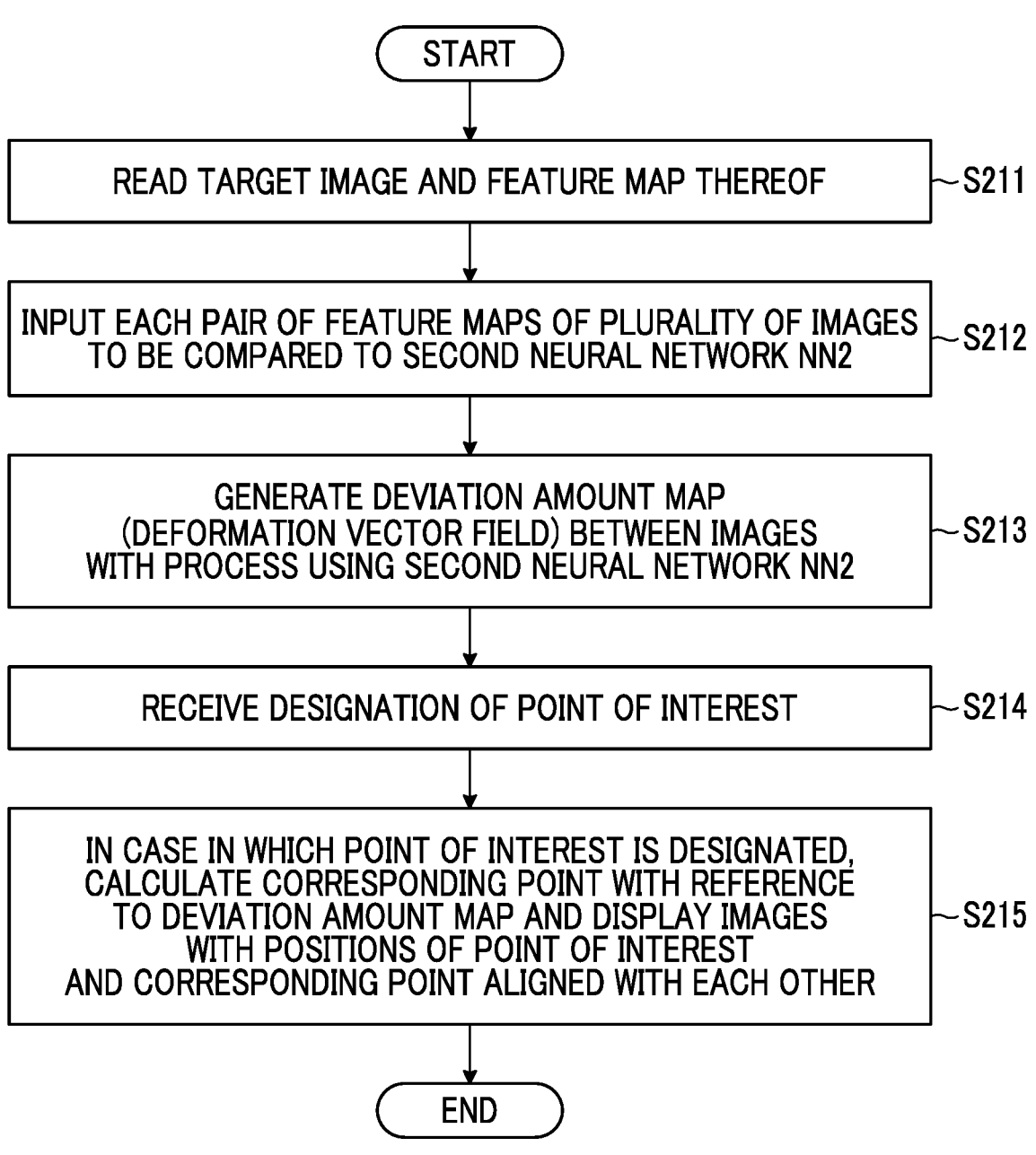

START

READ TARGET IMAGE AND FEATURE MAP THEREOF  ~S211

INPUT EACH PAIR OF FEATURE MAPS OF PLURALITY OF IMAGES TO BE COMPARED TO SECOND NEURAL NETWORK NN2  ~S212

GENERATE DEVIATION AMOUNT MAP (DEFORMATION VECTOR FIELD) BETWEEN IMAGES WITH PROCESS USING SECOND NEURAL NETWORK NN2  ~S213

RECEIVE DESIGNATION OF POINT OF INTEREST  ~S214

IN CASE IN WHICH POINT OF INTEREST IS DESIGNATED, CALCULATE CORRESPONDING POINT WITH REFERENCE TO DEVIATION AMOUNT MAP AND DISPLAY IMAGES WITH POSITIONS OF POINT OF INTEREST AND CORRESPONDING POINT ALIGNED WITH EACH OTHER  ~S215

END

IMAGE PROCESSING METHOD, IMAGE PROCESSING DEVICE, PROGRAM, AND TRAINED MODEL

CROSS-REFERENCE TO RELATED APPLICATION

The present application claims priority under 35 U.S.C § 119(a) to Japanese Patent Application No. 2021-212816 filed on Dec. 27, 2021, which is hereby expressly incorporated by reference, in its entirety, into the present application.

BACKGROUND OF THE INVENTION

1. Field of the Invention

The present disclosure relates to an image processing method, an image processing device, a program, and a trained model, and particularly, to an image processing technique for performing registration between a plurality of images.

2. Description of the Related Art

In a dynamic contrast examination of a liver performed using a computed tomography (CT) apparatus or a magnetic resonance imaging (MRI) apparatus, a plurality of images of different time phases are captured while a contrast agent is injected, and a change in the degree of enhancement of a lesion portion is observed. In this examination, since images of three or four time phases are captured for 2 to 3 minutes, body movement may occur due to a change in a respiratory state while the image of each time phase is captured. In a case in which the body movement occurs, the positions of the images deviate from each other. Therefore, it is difficult to compare the images of each time phase.

Various methods for registering images are known. In recent years, a method using deep learning has been widely studied (K. A. J. Eppenhof and J. P. W. Pluim. "Pulmonary CT Registration through Supervised Learning with Convolutional Neural Networks." IEEE Transactions on Medical Imaging, 38(5):1097-1105, 2019.ISSN 0278-0062. doi: 10.1109/Tmi.2018.2878316. and Yabo Fu, Tonghe Wang, Walte J. Curran, Tian Liu, Xiaofen Yang, "Deep Learning in Medical Image Registration: A Review"<https://arxiv.org/pdf/1912.12318.pdf>). K. A. J. Eppenhof and J. P. W. Pluim. "Pulmonary CT Registration through Supervised Learning with Convolutional Neural Networks." IEEE Transactions on Medical Imaging, 38(5):1097-1105, 2019.ISSN 0278-0062. doi: 10.1109/Tmi.2018.2878316. discloses a method that generates a prediction model (registration model) which outputs a deformation vector field between two images for the input of the two images, using deep learning, and performs registration between the images. In K. A. J. Eppenhof and J. P. W. Pluim. "Pulmonary CT Registration through Supervised Learning with Convolutional Neural Networks." IEEE Transactions on Medical Imaging, 38(5):1097-1105, 2019.ISSN 0278-0062. doi: 10.1109/Tmi.2018.2878316, one image and an image, which has been artificially generated from the deformation vector field, are used during learning, which makes it unnecessary to define a ground truth from two images. The method disclosed in K. A. J. Eppenhof and J. P. W. Pluim. "Pulmonary CT Registration through Supervised Learning with Convolutional Neural Networks." IEEE Transactions on Medical Imaging, 38(5): 1097-1105, 2019.ISSN 0278-0062. doi: 10.1109/

Tmi.2018.2878316. has a structure in which a 3D U-net architecture is adopted as a network structure and two images to be registered are input as two channels.

SUMMARY OF THE INVENTION

The dynamic contrast examination is a method in which, after an iodine contrast agent is intravenously injected into an arm, the same part is repeatedly imaged and a change in the part over time is observed. The contrast time phase is a state in which a specific number of seconds have elapsed since the injection of a contrast agent. Examples of the contrast time phase include an arterial phase, a portal phase (hepatic parenchymal phase), and an equilibrium phase in the dynamic contrast examination of the liver. For example, in the arterial phase, a large amount of contrast agent is flowing through the artery. The time phase and the appearance of a tumor differ depending on the type of tumor. In addition, a state before the contrast agent is injected is called a non-contrast phase.

In general, in the dynamic contrast examination of the liver, it is necessary to perform imaging four times in the non-contrast phase, the arterial phase, the portal phase, and the equilibrium phase and to compare a change in image between the plurality of time phases. Since there is a time difference between the time phases, a positional deviation occurs between the images of different time phases. Therefore, in the case of image interpretation, it is necessary to perform registration between images having different contrast states such that a common region of interest can be observed in the images of each time phase. Responsiveness of image processing including this registration process is required.

Meanwhile, a three-dimensional image, such as a CT image or an MRI image, has a large amount of data, and a large amount of calculation resources are required for registration between the images. In particular, in a case in which a combination of the images of a plurality of time phases is present as in the dynamic contrast examination, the amount of calculation becomes larger as the number of combinations of the images to be registered becomes larger.

For example, the following two approaches are considered in order to achieve the responsiveness of the registration process, the subsequent property analysis process, and the like.

First Approach and Task Thereof

As a first approach, it is considered to reduce the amount of calculation by narrowing down an observation region to a region of interest, such as the vicinity of a lesion region, in the captured image and inputting the region of interest.

However, in a case in which any one of N images is set as a reference image and the other images are registered with the reference image, the adoption of the method disclosed in K. A. J. Eppenhof and J. P. W. Pluim. "Pulmonary CT Registration through Supervised Learning with Convolutional Neural Networks." IEEE Transactions on Medical Imaging, 38(5):1097-1105, 2019.ISSN 0278-0062. doi: 10.1109/Tmi.2018.2878316. makes it necessary to perform 3D U-net calculation for a combination of 2-channel input images (N−1) times. Therefore, further improvement in processing efficiency is required.

Second Approach and Task Thereof

As a second approach, the following is considered: in a stage in which images captured by an examination are stored, all of the images or all of the organs are registered, and a deformation vector field indicating a correspondence relationship between pixels on the images as a result of the registration is stored. In this case, during image interpretation, the positional deviation is corrected with reference to the stored result.

However, this method has a problem that it is necessary to store the calculation result of the registration in advance for each combination between the images and the storage capacity required to store the calculation result is large.

The present disclosure has been made in view of the above circumstances, and an object of the present disclosure is to provide an image processing method, an image processing device, a program, and a trained model that can suppress calculation resources required for registration between a plurality of images.

According to one aspect of the present disclosure, there is provided an image processing method that is executed by one or more processors. The image processing method comprises: allowing the one or more processors to acquire feature maps of each of a plurality of images; and allowing the one or more processors to calculate a deformation vector field from a combination of the feature maps of each image.

The description of "acquiring feature maps" is not limited to a case in which one or more processors acquire the feature maps from the outside and includes a concept that one or more processors generate and acquire the feature maps.

According to this aspect, each feature map is acquired for each image. Therefore, even in a case in which there are a plurality of combinations of the images to be registered, it is possible to suppress calculation resources in the calculation of a deformation vector field between the images.

In the image processing method according to another aspect of the present disclosure, the one or more processors may generate the feature maps respectively from the plurality of images using a first neural network, input the combination of the feature maps generated for each image using the first neural network to a second neural network, and calculate the deformation vector field using the second neural network.

In the image processing method according to still another aspect of the present disclosure, the first neural network may be a network that receives an input of one image, processes the input one image, and outputs one or more feature maps, and the second neural network may be a network that receives an input of a pair of feature maps respectively generated from two different images, processes the pair of feature maps, and outputs the deformation vector field between the two different images.

In the image processing method according to yet another aspect of the present disclosure, the first neural network and the second neural network may be trained models that have been subjected to machine learning in advance using a learning image set, and a process of the machine learning may be performed such that a combination of feature maps of two images obtained by inputting each of the two images to the first neural network is input to the second neural network and the second neural network outputs the deformation vector field.

In the image processing method according to still yet another aspect of the present disclosure, the learning image set may include a plurality of different images, and one of the two images input to the first neural network during the machine learning may be an image generated by deforming the other image.

In the image processing method according to yet still another aspect of the present disclosure, a deformation field that defines the deformation may be randomly generated within a predetermined constraint range, the deformation field applied to a process of the deformation may be set as a ground truth, and learning may be performed such that an output of the second neural network approaches the ground truth.

According to still yet another aspect of the present disclosure, in the image processing method, each of the plurality of images may be a medical image.

According to yet still another aspect of the present disclosure, in the image processing method, the plurality of images may be images having different contrast states. The contrast state includes the presence or absence of contrast and a time phase.

According to still yet another aspect of the present disclosure, the image processing method may further comprise allowing the one or more processors to analyze the plurality of images registered using the deformation vector field and to output a property finding indicating a contrast effect of a region of interest.

According to yet still another aspect of the present disclosure, in the image processing method, the plurality of images may be images captured on different days.

According to still yet another aspect of the present disclosure, in the image processing method, the plurality of images may be images captured by different modalities.

According to yet still another aspect of the present disclosure, in the image processing method, the plurality of images may be three or more images, and the one or more processors may calculate the deformation vector field for each of combinations of a reference image, which is one of the plurality of images, and images other than the reference image from each combination of the feature maps of two images of the reference image and the image other than the reference image.

According to still yet another aspect of the present disclosure, the image processing method may further comprise: allowing the one or more processors to receive a designation of a point of interest in one of the plurality of images; allowing the one or more processors to calculate a corresponding point which corresponds to the point of interest in the other images among the plurality of images on the basis of the calculated deformation vector field; and allowing the one or more processors to display the images such that positions of the point of interest and the corresponding point are aligned with each other.

According to yet still another aspect of the present disclosure, there is provided an image processing device comprising: one or more processors; and one or more memories that store a program to be executed by the one or more processors. The one or more processors execute commands of the program to acquire feature maps of each of a plurality of images and to calculate a deformation vector field from a combination of the feature maps of each image.

According to yet still another aspect of the present disclosure, in the image processing device, the one or more processors may generate the feature maps of generate the feature maps respectively from the plurality of images using a first neural network, input the combination of the feature maps generated for each image using the first neural network to a second neural network, and calculate the deformation vector field using the second neural network.

According to still yet another aspect of the present disclosure, there is provided a program that causes a computer to implement: a function of acquiring feature maps of each of a plurality of images; and a function of calculating a deformation vector field from a combination of the feature maps of each image.

According to yet still another aspect of the present disclosure, the program may cause the computer to implement:

a function of generating the feature maps respectively from the plurality of images using a first neural network; and a function of inputting the combination of the feature maps generated for each image using the first neural network to a second neural network and calculating the deformation vector field using the second neural network.

According to still yet another aspect of the present disclosure, there is provided a trained model that causes a computer to implement a function of calculating a deformation vector field from a plurality of images. The trained model comprises a first neural network and a second neural network. The first neural network has been trained to receive an input of one image, to process the input one image, and to output one or more feature maps, and the second neural network has been trained to receive an input of a pair of feature maps respectively generated from two different images using the first neural network, to process the pair of the feature maps, and to output the deformation vector field between the two different images.

According to the present disclosure, it is possible to suppress the calculation resources required for registration between a plurality of images.

BRIEF DESCRIPTION OF THE DRAWINGS

FIG. 9 is a flowchart illustrating a region-of-interest registration process in a dynamic contrast CT examination of a liver illustrated in FIG. 8.

FIG. 16 is a flowchart illustrating the registration process applied to comparison over time illustrated in FIG. 14 and illustrates an example of a process during image interpretation.

DESCRIPTION OF THE PREFERRED EMBODIMENTS

Hereinafter, preferred embodiments of the invention will be described in detail with reference to the accompanying drawings.

Outline of Image Processing Method According to First Embodiment

Registration between two images is achieved by calculating a deformation vector field between the two images. The deformation vector field is a space in which deformation vectors for matching any point on a deformed image with a corresponding point on a target image are arranged.

Figure 1:
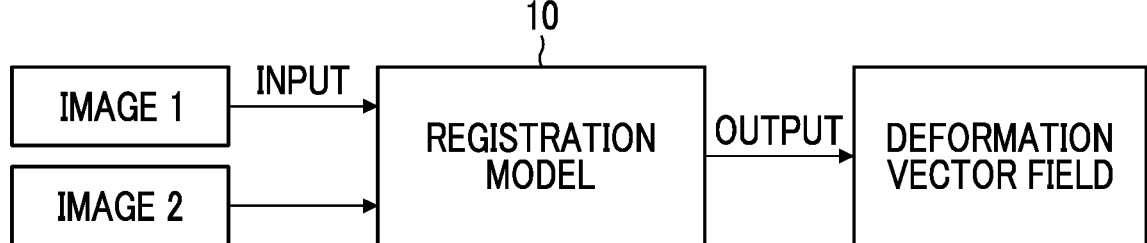
FIG. 1 is a conceptual diagram illustrating an operation of a registration model for calculating a deformation vector field between two images.

FIG. 1 is a conceptual diagram illustrating an operation of a registration model 10 that calculates the deformation vector field between two images. The registration model 10 is a machine learning model that is configured as computer software (program). The registration model 10 is, for example, a trained model that is configured using a convolution neural network and is trained to output the deformation vector field in response to the input of two images to be registered.

Figure 2:
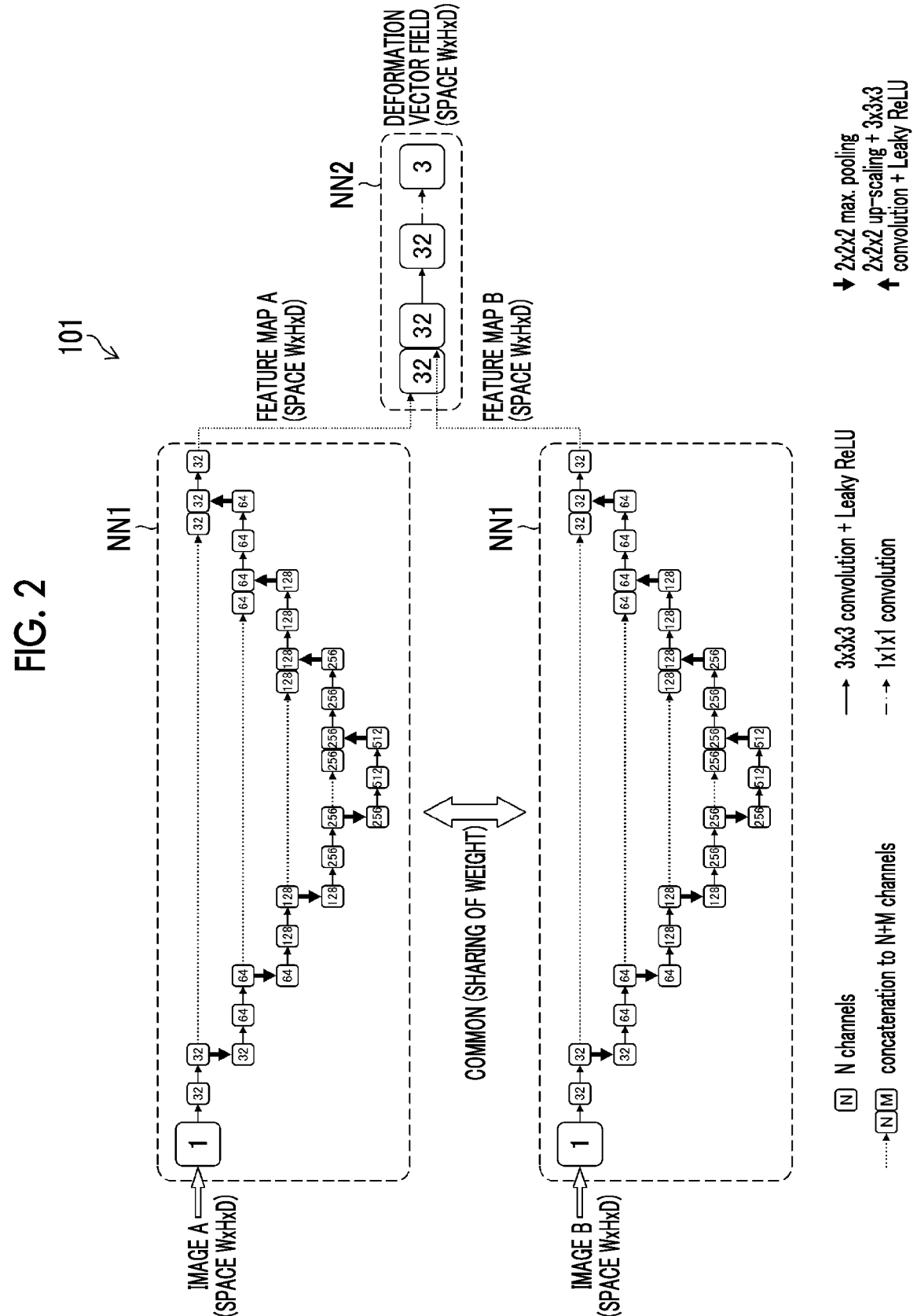
FIG. 2 is a network structure diagram schematically illustrating a network structure of a registration model used in an image processing method according to a first embodiment.

In this embodiment, a neural network having a network structure illustrated in FIG. 2 is adopted as the registration model 10. FIG. 2 is a network structure diagram schematically illustrating a network structure of a registration model 101 used in an image processing method according to the first embodiment. Here, an example of a case in which a deformation vector field between two images of an image A and an image B will be described. The image A and the image B are three-dimensional images captured by, for example, a CT apparatus. Here, the three-dimensional image includes the concept of an aggregate of two-dimensional slice images captured continuously. The image A and the image B may be three-dimensional images reconstructed from three-dimensional data obtained by continuously capturing two-dimensional slice tomographic images.

For comparison, description will be made in comparison with the structure of the neural network described in FIG. 2 of K. A. J. Eppenhof and J. P. W. Pluim. "Pulmonary CT Registration through Supervised Learning with Convolutional Neural Networks." IEEE Transactions on Medical Imaging, 38(5):1097-1105, 2019.ISSN 0278-0062. doi: 10.1109/Tmi.2018.2878316. The neural network described in FIG. 2 of K. A. J. Eppenhof and J. P. W. Pluim. "Pulmonary CT Registration through Supervised Learning with Convolutional Neural Networks." IEEE Transactions on Medical Imaging, 38(5):1097-1105, 2019.ISSN 0278-

0062. doi: 10.1109/Tmi.2018.2878316. adopts a 3D U-net architecture that receives the input of two images as two channels.

In contrast, in the image processing method according to this embodiment, a neural network that calculates a deformation vector field from two images is configured to be divided into a portion common to each image and an individual portion. That is, as illustrated in FIG. 2, the registration model 101 according to this embodiment includes a first neural network NN1 that is applied in common to each of the images to be registered and a second neural network NN2 to which a combination of the outputs of the first neural network NN1 is input.

The first neural network NN1 is a network that receives the input of one image and outputs a feature map of the input image. The first neural network NN1 functions as a feature extraction unit that extracts features from the input image. The second neural network NN2 is a network that receives the input of a combination of the feature maps corresponding to two images generated using the first neural network NN1 and outputs a deformation vector field between the two images for the input. The second neural network NN2 functions as a deformation vector field calculation unit that calculates a deformation vector field from the input combination of the feature maps.

The first neural network NN1 illustrated in FIG. 2 has a 3D U-net architecture. The number in the square in FIG. 2 indicates the number of channels. The first neural network NN1 is different from the two-channel input configuration described in K. A. J. Eppenhof and J. P. W. Pluim. "Pulmonary CT Registration through Supervised Learning with Convolutional Neural Networks." IEEE Transactions on Medical Imaging, 38(5):1097-1105, 2019.ISSN 0278-0062. doi: 10.1109/Tmi.2018.2878316. in that the number of input channels is one and one image is input as one channel.

In FIG. 2, a right-pointing solid arrow between the squares with the number of channels indicates a process including a three-dimensional convolution operation using a 3×3×3 filter and an operation using a leaky rectified linear unit (LReLU) as an activation function. In addition, in FIG. 2, a downward arrow indicates a max pooling process using a 2×2×2 filter. In FIG. 2, two squares arranged at the tip of a right-pointing dashed arrow indicate coupling between channels. In FIG. 2, an upward arrow indicates a process including up-scaling using a 2×2×2 filter, a convolution operation using a 3×3×3 filter, and an operation using LReLU. In addition, a right-pointing one-dot chain arrow (a process of converting 32 channels into 3 channels) in the final stage of the second neural network NN2 indicates a process of a convolution operation using a 1×1×1 filter. Three channels obtained as the output of the second neural network NN2 correspond to components of x, y, and z of the deformation vector field, respectively.

In the registration model 101 illustrated in FIG. 2, two networks of the first neural network NN1 that receives the input of the image A and outputs a feature map A of the image A and the first neural network NN1 that receives the input of the image B and outputs a feature map B of the image B are illustrated. The two first neural networks NN1 are the same (common) networks that share weights (network parameters). A process for each image using the first neural network NN1 may be a parallel process, a concurrent process, or a sequential process.

In FIG. 2, a pair of the feature map A output from the first neural network NN1 by inputting the image A to the first neural network NN1 and the feature map B output from the first neural network NN1 by inputting the image B to the first neural network NN1 is input to the second neural network NN2, and a deformation vector field between the image A and the image B is output from the second neural network NN2.

The data representation of the image input to the first neural network NN1 may be three-dimensional data of a space of W×H×D. W indicates the number of pixels in the X-axis direction, H indicates the number of pixels in the Y-axis direction, and D indicates the number of pixels in the Z-axis direction. W, H, and D can be set to any values. W×H×D may be, for example, 128×128×128 or 512×512× 512. The representation of the deformation vector field output from the second neural network NN2 may be the same space of W×H×D as the image A and the image B.

As illustrated in FIG. 2, the network of the registration model 101 has a network structure divided into the first neural network NN1 that receives each of two images to be registered as the input of one channel and performs feature extraction for each image and the second neural network NN2 that receives the input of a combination of the feature maps extracted from each image by the first neural network NN1 and calculates the deformation vector field between the images, and the first neural network NN1 and the second neural network NN2 can be separately calculated.

For Registration Among Three Images Including Image C

In FIG. 1, the case in which the registration between the image A and the image B is performed has been described. However, in a case in which the registration between the image A and an image C is performed, the image C is input to the first neural network NN1, and a feature map C corresponding to the image C is output from the first neural network NN1 as in the case of the image B. Then, a combination of the feature map A and the feature map C is input to the second neural network NN2, and a deformation vector field is output from the second neural network NN2 for the input of the combination of the feature map A and the feature map C.

Figure 3:
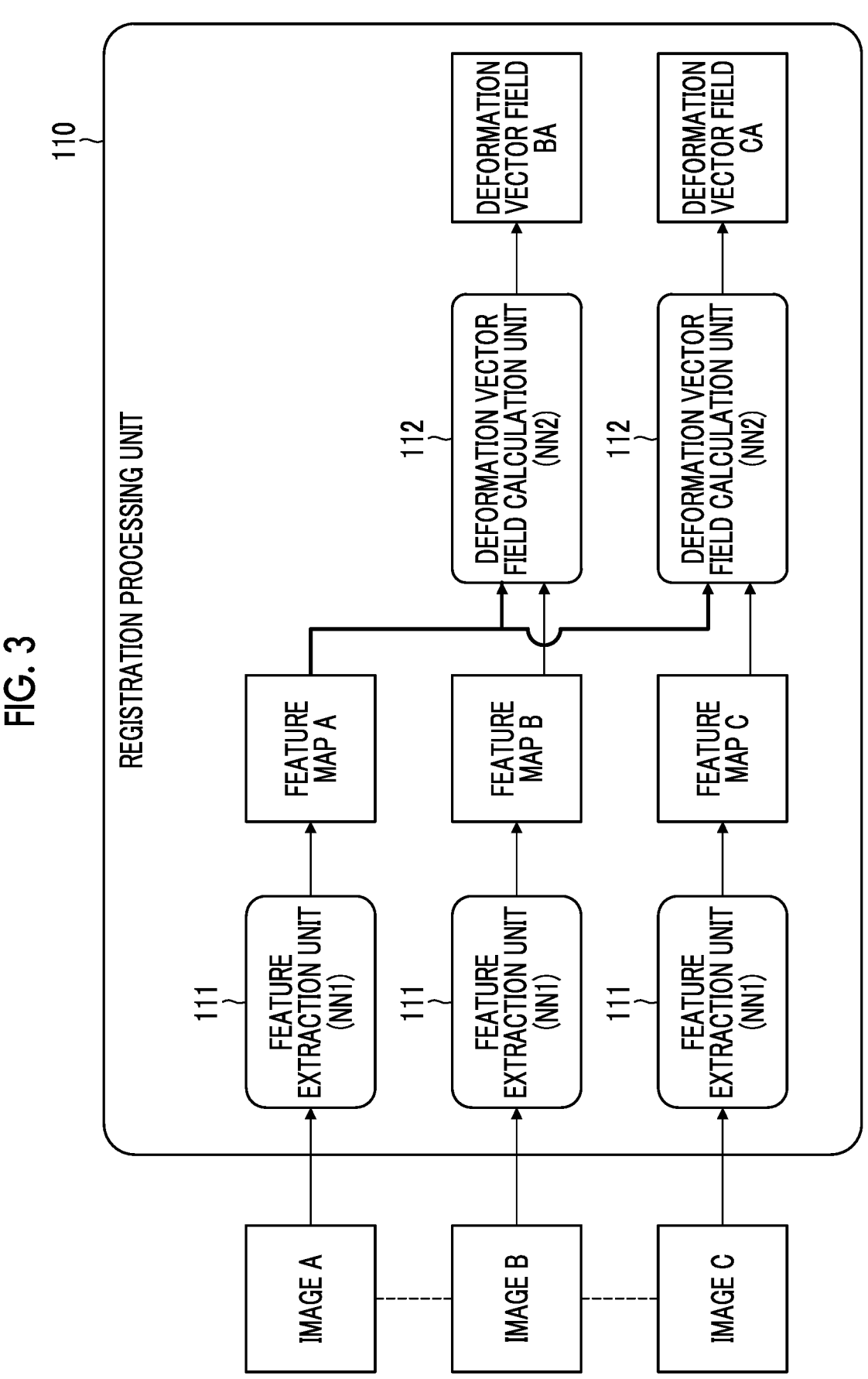
FIG. 3 is a diagram illustrating a process in a case in which each of an image B and an image C is registered with an image A.

FIG. 3 is a diagram illustrating an outline of a process in a case in which the registration between the image A and each of the image B and the image C is performed using the image processing method according to this embodiment. A registration processing unit 110 illustrated in FIG. 3 is an image processing unit to which the registration model 101 described with reference to FIG. 2 is applied. The registration processing unit 110 includes a feature extraction unit 111 that is configured using the first neural network NN1 and a deformation vector field calculation unit 112 that is configured using the second neural network NN2.

In the image processing method according to this embodiment, as illustrated in FIG. 3, a feature extraction process is performed on each of the image A, the image B, and the image C using the first neural network NN1, and the feature map A, the feature map B, and the feature map C are generated for each image. That is, each of the image A, the image B, and the image C is input to the first neural network NN1, and an operation using the first neural network NN1 is performed for each image. Then, each of a combination of the feature map A and the feature map B and a combination of the feature map A and the feature map C is input to the second neural network NN2, and an operation using the second neural network NN2 is performed with the combinations of the feature maps.

Then, a deformation vector field BA is output from the second neural network NN2 to which the combination of the feature map A and the feature map B has been input, and a deformation vector field CA is output from the second neural network NN2 to which the combination of the feature map A and the feature map C has been input.

In a case in which the image A is used as a reference image and the registration between the image A and each of the image B and the image C is performed, it is necessary to perform the calculation of the entire network for each of an image pair of the combination of the image A and the image B and an image pair of the combination of the image A and the image C in the method described in K. A. J. Eppenhof and J. P. W. Pluim. "Pulmonary CT Registration through Supervised Learning with Convolutional Neural Networks." IEEE Transactions on Medical Imaging, 38(5):1097-1105, 2019.ISSN 0278-0062. doi: 10.1109/Tmi.2018.2878316.

In contrast, according to this embodiment, the calculation of the feature map A for the image A which is a reference for registration can be performed once, and the calculation result (feature map A) can be combined with each of the feature map B and the feature map C. The combinations can be input to the second neural network NN2, and the deformation vector field BA and the deformation vector field CA can be calculated. Therefore, the amount of calculation for a pair of two images can be suppressed as compared to the method described in K. A. J. Eppenhof and J. P. W. Pluim. "Pulmonary CT Registration through Supervised Learning with Convolutional Neural Networks." IEEE Transactions on Medical Imaging, 38(5):1097-1105, 2019.ISSN 0278-0062. doi: 10.1109/Tmi.2018.2878316.

Similarly, in a case in which four or more images are registered, according to this embodiment, it is possible to suppress the amount of calculation required for a pair of two images to be registered.

Second Embodiment

Figure 4:
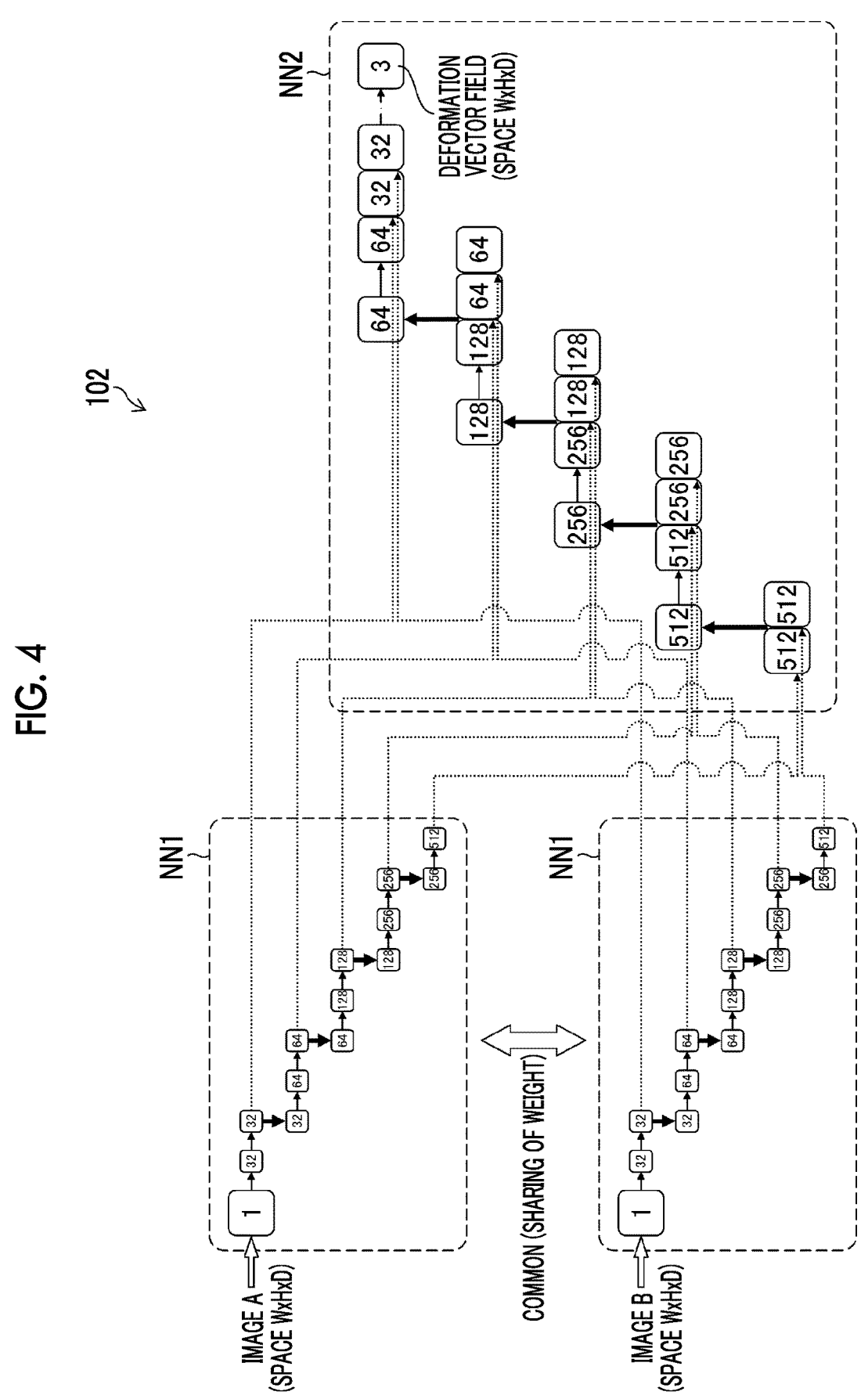
FIG. 4 is a network structure diagram illustrating a registration model according to a second embodiment.

FIG. 4 is a network structure diagram illustrating a registration model 102 according to a second embodiment. Instead of the configuration described with reference to FIG. 2, a network structure illustrated in FIG. 4 may be adopted. The description rules of the drawings in FIG. 4 are the same as those in FIG. 2. The difference of the registration model 102 illustrated in FIG. 4 from that illustrated in FIG. 2 will be described.

The registration model 102 comprises a first neural network NN1 and a second neural network NN2 having the network structure illustrated in FIG. 4, instead of the first neural network NN1 and the second neural network NN2 having the network structure illustrated in FIG. 2.

The first neural network NN1 illustrated in FIG. 4 has a network structure corresponding to an encoder portion (down-sampling portion) which is the first half of the network of the 3D U-net type described with reference to FIG. 2. The first neural network NN1 illustrated in FIG. 4 receives the input of one image and outputs a plurality of feature maps from the input image. The feature maps output from the first neural network NN1 illustrated in FIG. 4 include a first feature map of 32 channels, a second feature map of 64 channels, a third feature map of 128 channels, a fourth feature map of 256 channels, and a fifth feature map of 512 channels. That is, the first neural network NN1 in the registration model 102 receives the input of the image A and outputs a feature map set including the plurality of types of feature maps. Similarly, the first neural network NN1 receives the input of the image B and outputs a feature map set corresponding to the image B.

The second neural network NN2 in the registration model 102 has a network structure corresponding to a decorator portion (up-sampling portion) which is the second half of the network of the 3D U-net type illustrated in FIG. 2 in K. A. J. Eppenhof and J. P. W. Pluim. "Pulmonary CT Registration through Supervised Learning with Convolutional Neural Networks." IEEE Transactions on Medical Imaging, 38(5): 1097-1105, 2019.ISSN 0278-0062. doi: 10.1109/ Tmi.2018.2878316. The second neural network NN2 receives the input of a combination of the feature map sets generated for each image using the first neural network NN1 illustrated in FIG. 4 and calculates a deformation vector field between two images from the combination of the input feature map sets.

The second neural network NN2 illustrated in FIG. 4 receives the input of a combination of the feature map set of the image A and the feature map set of the image B and outputs a deformation vector field between the image A and the image B.

Similarly, in a case in which the registration between the image A and each of the image B and the image C is performed, the image C is input to the first neural network NN1, and a feature map set corresponding to the image C is output from the first neural network NN1, which is not illustrated. Then, a combination of the feature map set of the image A and the feature map set of the image C is input to the second neural network NN2, and a deformation vector field between the image A and the image C is output from the second neural network NN2. Similarly, in a case in which four or more images are registered, according to this embodiment, it is possible to suppress the amount of calculation in the calculation of a deformation vector field between the images for combinations of a plurality of images to be registered.

Third Embodiment

Figure 5:
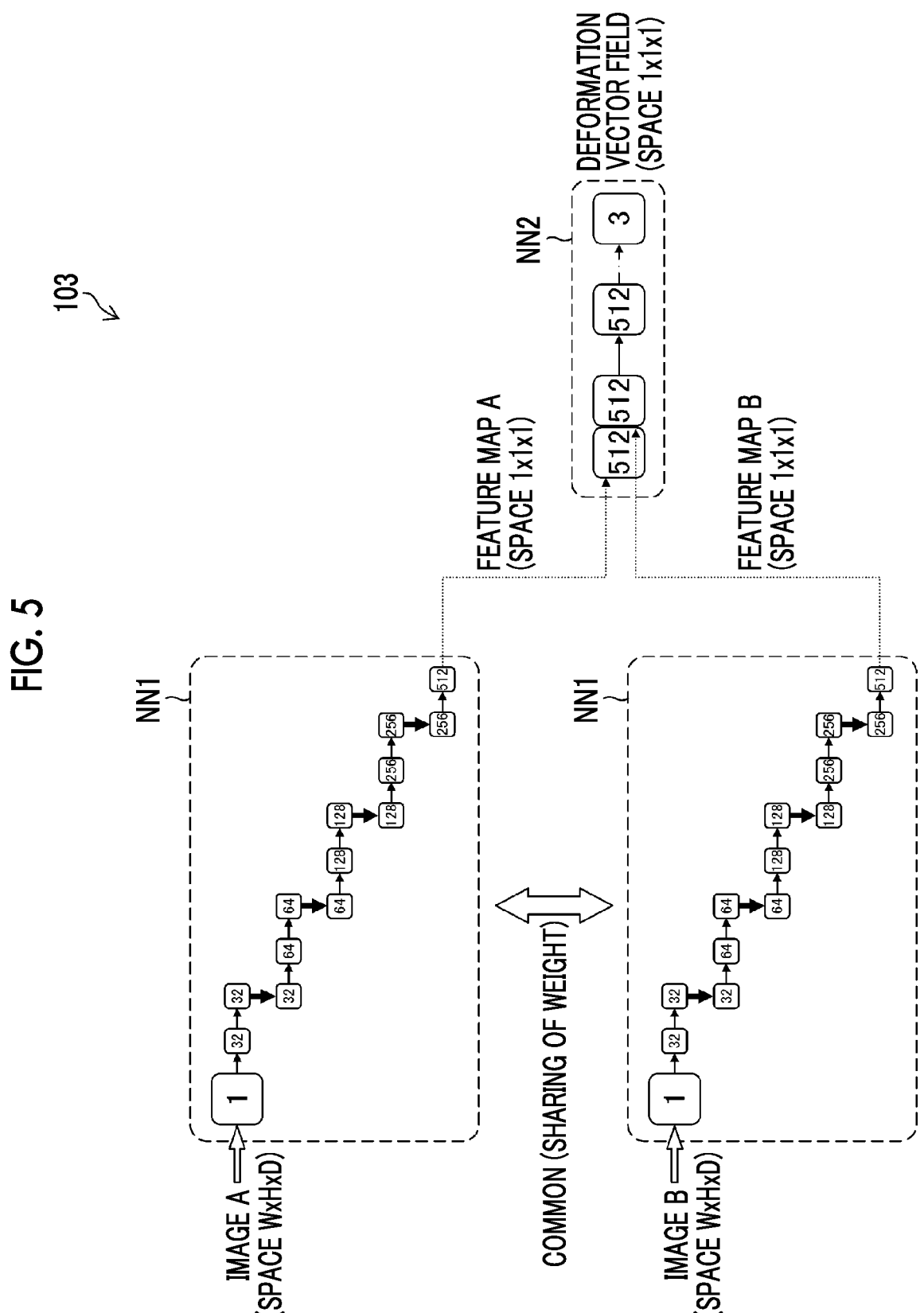
FIG. 5 is a network structure diagram illustrating a registration model according to a third embodiment.

FIG. 5 is a network structure diagram illustrating a registration model 103 according to a third embodiment. Instead of the configuration described with reference to FIG. 2, a network structure illustrated in FIG. 5 may be adopted. The description rules of the drawings in FIG. 5 are the same as those in FIG. 2. The difference of the configuration of the registration model 103 illustrated in FIG. 5 from the configurations illustrated in FIGS. 2 and 4 will be described.

The registration model 103 comprises a first neural network NN1 and a second neural network NN2 having the network structure illustrated in FIG. 5, instead of the first neural network NN1 and the second neural network NN1 having the network structure illustrated in FIG. 2.

The first neural network NN1 illustrated in FIG. 5 may have the same network structure as the first neural network NN1 illustrated in FIG. 4. The first neural network NN1 illustrated in FIG. 5 receives the input of one image and outputs a feature map of 512 channels from the input image. The representation of the feature map output by the first neural network NN1 is a space of 1×1×1.

The first neural network NN1 of the registration model 103 outputs a feature map A for the input of the image A. In addition, the first neural network NN1 outputs a feature map B for the input of the image B. FIG. 5 illustrates an example in which a pair of the feature map A output from the first neural network NN1 by inputting the image A to the first neural network NN1 and the feature map B output from the first neural network NN1 by inputting the image B to the first neural network NN1 is input to the second neural network NN2.

The second neural network NN2 in the registration model 103 receives the input of a combination of the feature maps of 512 channels of a space of 1×1×1 as an input and calculates a deformation vector field between two images on the basis of the input. The representation of the deformation vector field output from the second neural network NN2 is a space of 1×1×1 which is the same as the input. The deformation vector field in this case corresponds to a deformation vector. That is, the representation of the feature map and the deformation vector field includes the case of a space of 1×1×1.

In the example illustrated in FIG. 5, a combination of the feature map A and the feature map B is input to the second neural network NN2, and a deformation vector field between the image A and the image B is output from the second neural network NN2. In a case in which three or more images including the image C are registered, similarly, according to this embodiment, it is possible to suppress the amount of calculation in the calculation of the deformation vector field for combinations of a plurality of images to be registered, which is not illustrated.

Example of Configuration of Medical Information System

Figure 6:
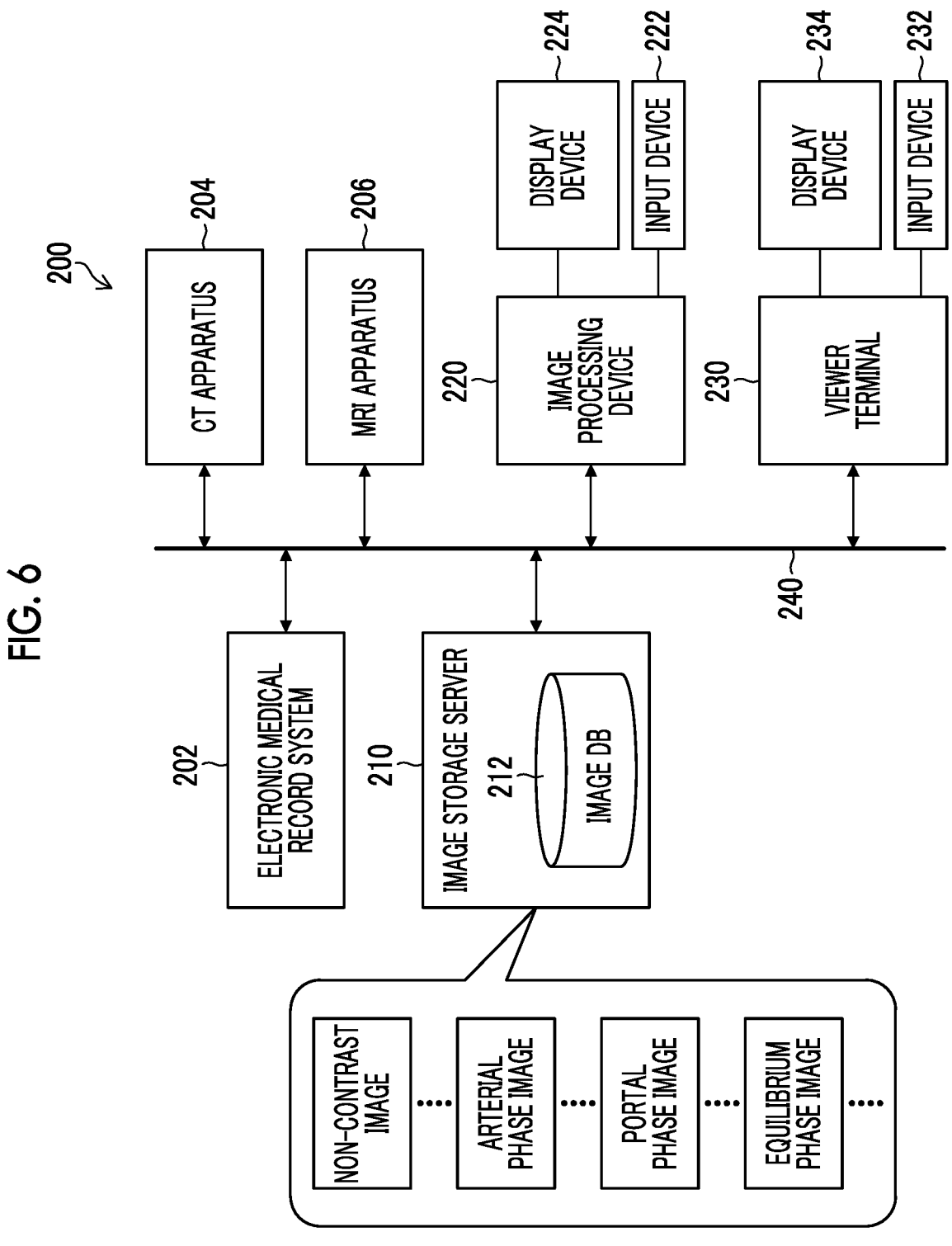
FIG. 6 is a block diagram illustrating an example of a configuration of a medical information system to which an image processing device according to the embodiment of the present disclosure is applied.

FIG. 6 is a block diagram illustrating an example of a configuration of a medical information system 200 to which an image processing device 220 according to the embodiment of the present disclosure is applied. The registration model 101, 102, or 103 described in each of the first to third embodiments is incorporated into the image processing device 220.

The medical information system 200 is achieved as a computer network that is constructed in a medical institution such as a hospital. The medical information system 200 includes an electronic medical record system 202, a CT apparatus 204, an MRI apparatus 206, an image storage server 210, the image processing device 220, and a viewer terminal 230, and these elements are connected through a communication line 240. The communication line 240 may be a local communication line in the medical institution. Further, a portion of the communication line 240 may include a wide area communication line. Some of the elements of the medical information system 200 may be configured by cloud computing.

In FIG. 6, the CT apparatus 204 and the MRI apparatus 206 are illustrated as examples of modalities. However, the apparatus for capturing a medical image is not limited to the CT apparatus 204 and the MRI apparatus 206, and there may be various examination apparatuses, such as an ultrasound diagnostic apparatus, a positron emission tomography (PET) apparatus, a mammography apparatus, an X-ray diagnostic apparatus, an X-ray fluoroscopic diagnostic apparatus, and an endoscope apparatus. There may be various combinations of the types and number of modalities connected to the communication line 240 for each medical institution.

The image storage server 210 may be, for example, a DICOM server that operates according to the specifications of Digital Imaging and Communications in Medicine (DICOM). The image storage server 210 is a computer that stores and manages various types of data including images captured by various modalities, such as the CT apparatus 204 and the MRI apparatus 206, and comprises a large-capacity external storage device and a database management program. The image storage server 210 communicates with other devices through the communication line 240 to transmit and receive various types of data including image data. The image storage server 210 receives various types of data including the images generated by a modality, such as the CT apparatus 204, through the communication line 240, stores the data in a recording medium, such as a large-capacity external storage device, and manages the data. In addition, the storage format of the image data and the communication between the apparatuses through the communication line 240 are based on a DICOM protocol.

For example, in a case in which a dynamic contrast examination of a liver is performed on a certain patient using the CT apparatus 204, a plurality of images including non-contrast images, arterial phase images, portal phase images, and equilibrium phase images obtained by imaging are stored in an image database 212 of the image storage server 210.

The image processing device 220 can acquire data from, for example, the image storage server 210 through the communication line 240. The image processing device 220 can be implemented using hardware and software of a computer. The form of the image processing device 220 is not particularly limited, and the image processing device 220 may be, for example, a server computer, a workstation, a personal computer, or a tablet terminal. The image processing device 220 may comprise an input device 222 and a display device 224.

The input device 222 may be, for example, a keyboard, a mouse, a touch panel, other pointing devices, a voice input device, or an appropriate combination thereof. The display device 224 is an output interface on which various types of information are displayed. The display device 224 may be, for example, a liquid crystal display, an organic electro-luminescence (OEL) display, a projector, or an appropriate combination thereof. In addition, the input device 222 and the display device 224 may be integrally configured like a touch panel. The input device 222 and the display device 224 may be included in the image processing device 220, or the image processing device 220, the input device 222, and the display device 224 may be integrally configured.

The image processing device 220 performs image analysis and various other types of processes on the medical images captured by the modality. The image processing device 220 may be configured to perform, for example, various analysis processes, such as computer aided detection (CAD), including a process of recognizing a lesion region or the like from an image, a process of specifying a classification, such as a disease name, and a segmentation process of recognizing a region of an organ or the like, in addition to the process of performing the registration between images. In addition, the image processing device 220 may include a processing module that supports the creation of an interpretation report. The image processing device 220 can transmit the processing result of image processing to the image storage server 210 and the viewer terminal 230. In addition, some or all of the processing functions of the image processing device 220 may be incorporated into the image storage server 210 or the viewer terminal 230.

Various types of information including various types of data stored in the image database 212 of the image storage server 210 and the processing results generated by the image processing device 220 can be displayed on the display device 234 of the viewer terminal 230.

The viewer terminal 230 may be an image browsing terminal which is called a picture archiving and communication system (PACS) viewer or a DICOM viewer. One viewer terminal 230 is illustrated in FIG. 6. However, a plurality of viewer terminals 230 can be connected to the communication line 240. The form of the viewer terminal 230 is not particularly limited, and the viewer terminal 230 may be, for example, a personal computer, a workstation, or a tablet terminal. The viewer terminal 230 comprises an input device 232 and a display device 234. The input device 232 and the display device 234 may have the same configurations as the input device 222 and the display device 224 of the image processing device 220.

Example of Hardware Configuration of Image Processing Device 220

Figure 7:
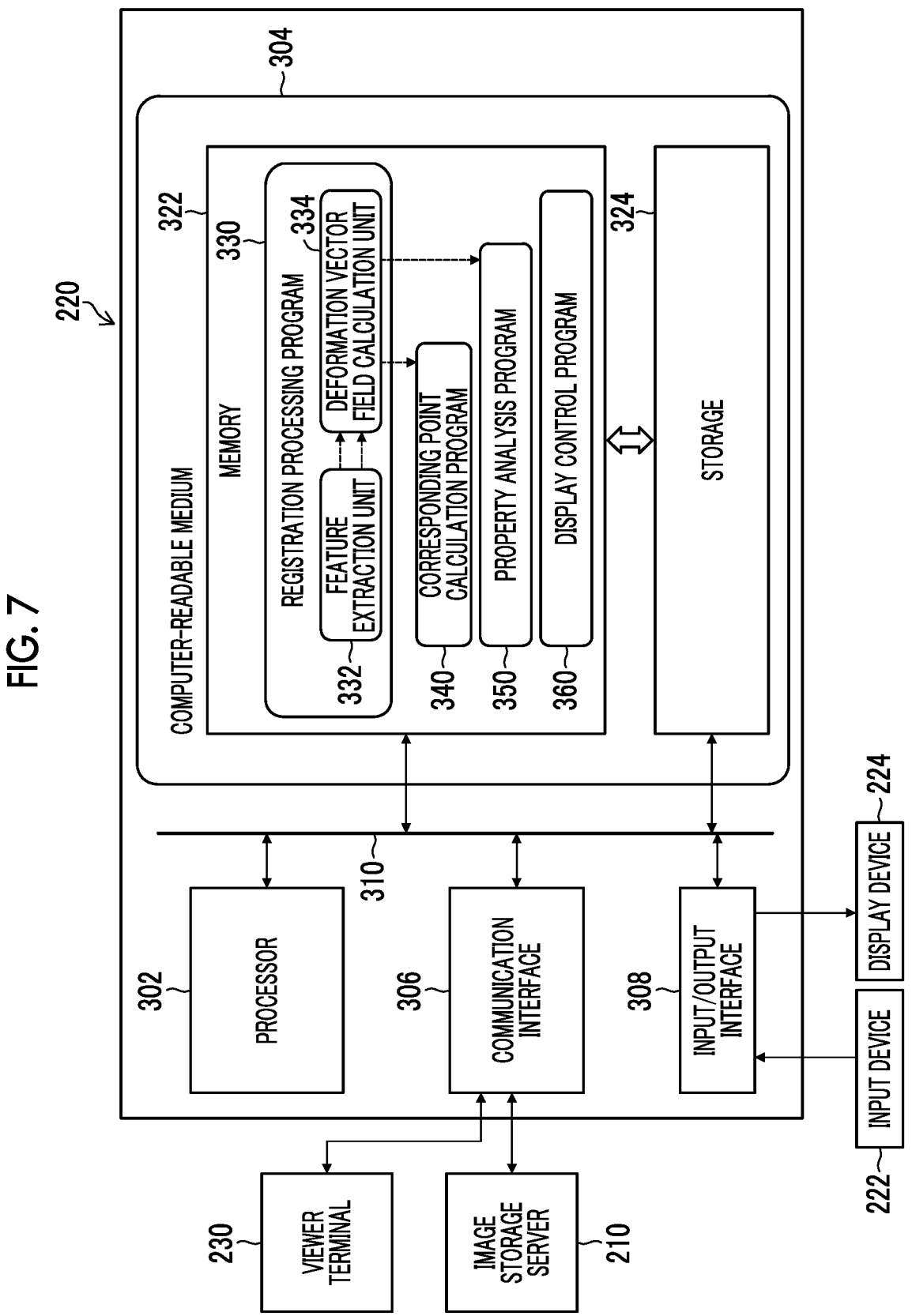
FIG. 7 is a block diagram schematically illustrating an example of a hardware configuration of the image processing device.

FIG. 7 is a block diagram schematically illustrating an example of the hardware configuration of the image processing device 220. The image processing device 220 can be implemented by a computer system that is configured using one or a plurality of computers. Here, an example in which one computer executes a program to implement various functions of the image processing device 220 will be described.

The image processing device 220 includes a processor 302, a computer-readable medium 304 which is a non-transitory tangible object, a communication interface 306, an input/output interface 308, and a bus 310.

The processor 302 includes a central processing unit (CPU). The processor 302 may include a graphics processing unit (GPU). The processor 302 is connected to the computer-readable medium 304, the communication interface 306, and the input/output interface 308 through the bus 310. The processor 302 reads, for example, various programs and data stored in the computer-readable medium 304 and performs various processes. The term "program" includes the concept of a program module and includes commands based on the program.

The computer-readable medium 304 is, for example, a storage device including a memory 322 which is a main memory and a storage 324 which is an auxiliary memory. The storage 324 is configured using, for example, a hard disk drive (HDD) device, a solid state drive (SSD) device, an optical disk, a magneto-optical disk, a semiconductor memory, or an appropriate combination thereof. The storage 324 stores, for example, various types of programs or data.

The memory 322 is used as a work area of the processor 302 and is used as a storage unit that temporarily stores the program and various types of data read from the storage 324. The program stored in the storage 324 is loaded to the memory 322, and the processor 302 executes commands of the program to function as units for performing various processes defined by the program. The memory 322 stores, for example, programs, such as a registration processing program 330, a corresponding point calculation program 340, a property analysis program 350, and a display control program 360 executed by the processor 302, and various types of data.

The registration processing program 330 includes the registration model 101, 102, or 103 described with reference to FIGS. 2 to 5. The processor 302 executes commands of the registration processing program 330 to function as a feature extraction unit 332 and a deformation vector field calculation unit 334. The corresponding point calculation program 340 is a program that performs a process of calculating a corresponding point in an image to be compared, using the deformation vector field calculated by the deformation vector field calculation unit 334.

The property analysis program 350 is an example of a CAD module that detects a region, such as a lesion, in an image and analyzes the properties of the lesion. The property analysis program 350 may be, for example, a program that analyzes the properties of liver tumor from a dynamic contrast CT image of the liver. The property analysis program 350 may be configured using a trained model that has been trained by machine learning to output the processing result of target property analysis from an input image. The property analysis program 350 analyzes the images of a plurality of time phases registered using the deformation vector field calculated by the deformation vector field calculation unit 334 and outputs a property finding indicating the contrast effect of a region of interest. The image processing device 220 may comprise other CAD modules, such as an organ recognition program and a lesion detection program (which are not illustrated), instead of the property analysis program 350.

The display control program 360 generates a display signal necessary for display output to the display device 224 and controls the display of the display device 224.

The communication interface 306 performs a wired or wireless communication process with an external device to exchange information with the external device. The image processing device 220 is connected to the communication line 240 through the communication interface 306 such that it can exchange data with devices such as the image storage server 210 and the viewer terminal 230. The communication interface 306 can play a role of a data acquisition unit that receives the input of data such as images.

The input device 222 and the display device 224 are connected to the bus 310 through the input/output interface 308.

Application Example 1

Figure 8:
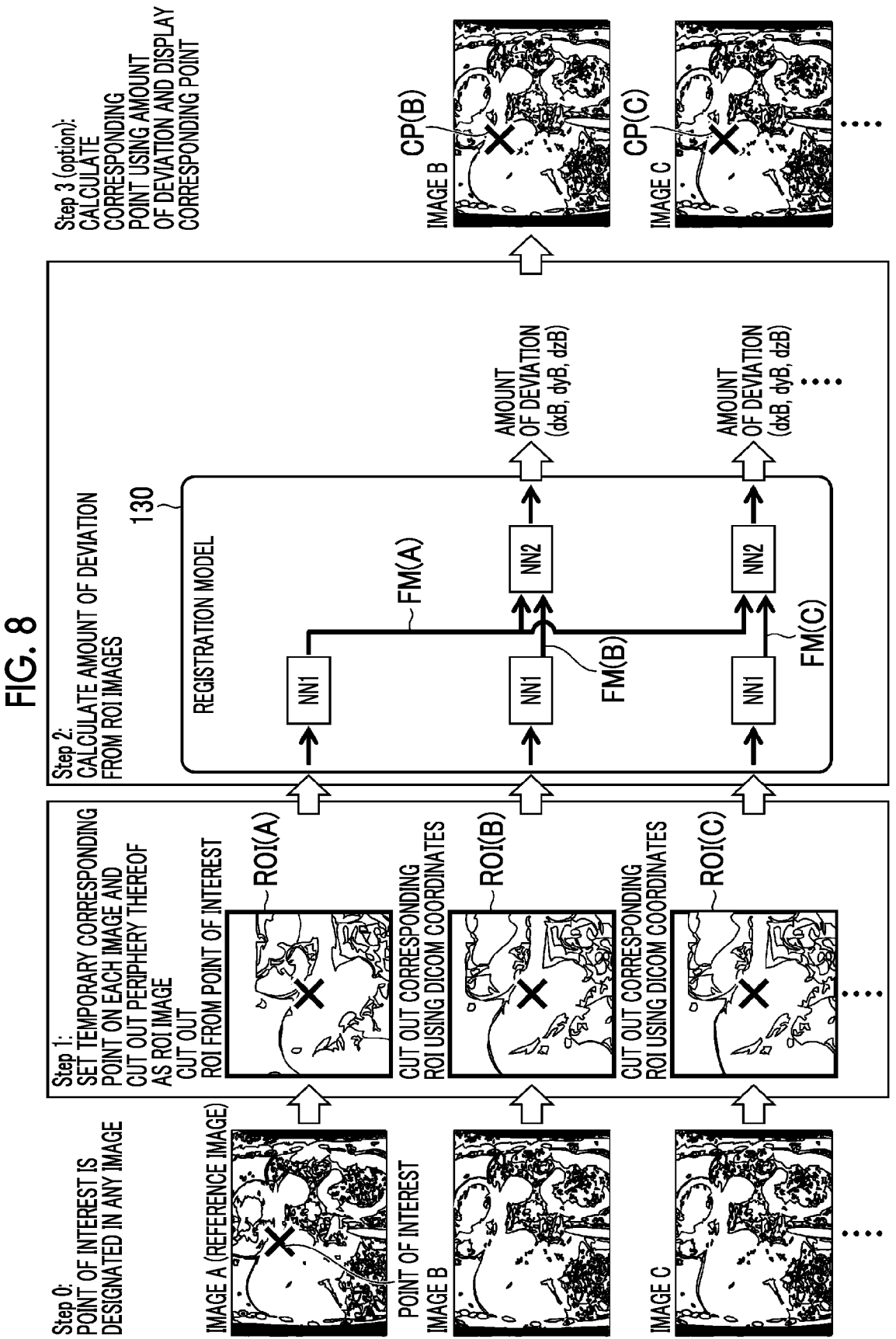
FIG. 8 is a diagram illustrating an outline of Application Example 1 of image processing using the image processing device.

FIG. 8 is a diagram illustrating an outline of Application Example 1 of image processing using the image processing device 220. FIG. 8 illustrates an example of a registration process for a region of interest (ROI) in a dynamic contrast CT examination of the liver. Here, an example in which the registration model 130 having the network structure (see FIG. 5) described in the third embodiment is used will be described.

In a case in which the dynamic contrast CT examination of the liver is performed on a certain patient, the images of a plurality of time phases captured by the CT apparatus 204 are stored in the image storage server 210. A doctor in charge of image interpretation can observe the image of each time phase using the viewer terminal 230. Three images A, B, and C illustrated on the leftmost side of FIG. 8 are examples of CT images having different contrast states. The image A, the image B, and the image C are examples of "medical images" in the present disclosure. FIG. 8 illustrates three images. However, four or more images may be present. Hereinafter, the procedure of the process by the image processing device 220 will be described with specific examples.

In Step 0, a point of interest is designated on an image of any time phase. In a case in which a doctor observes an image in a state in which one or more of the images of a plurality of time phases are displayed on the display device 234 of the viewer terminal 230 and finds a region suspected to be a lesion, such as liver tumor, the doctor can perform the input of designating the point of interest of the region. The operation of the input of designating the point of interest can be performed using the input device 222. Among the images of the plurality of time phases, the image on which the point of interest has been designated is a reference image during registration. FIG. 8 illustrates an example in which the point of interest is designated in the image A, and the image A is the reference image. For example, the image A may be an image of the arterial phase, the image B may be an image of the portal phase, and the image C may be an image of the equilibrium phase. In addition, an image D (for example, a non-contrast image) may be further included, which is not illustrated in FIG. 8.

In a case in which the point of interest is designated, the image processing device 220 performs a process of setting a temporary corresponding point on each image and cutting out the periphery thereof as an ROI image in Step 1. For the image A as the reference image on which the point of interest is designated, the periphery including the point of interest is cut out as the ROI image on the basis of the point of interest. For example, the image processing device 220 cuts out an image region having a predetermined size around the point of interest as the ROI image. The image size to be cut out as the ROI image may be a predetermined size or may be any designated or selected size. The ROI image cut out from the image A is referred to as an ROI(A).

For images other than the reference image, for example, the image B and the image C, the image processing device 220 set a temporary corresponding point which corresponds to the point of interest using the DICOM coordinates of the point of interest and cuts out the periphery including the temporary corresponding point as the ROI image on the basis of the temporary corresponding point. Here, the DICOM coordinates mean positional information obtained from, for example, an "image position (patient)" of tag numbers (0020, 0032) included in DICOM header information. The ROI image cut out from the image B is referred to as an ROI(B), and the ROI image cut out from the image C is referred to as an ROI(C).

Then, in Step 2, the image processing device 220 performs a process of calculating the amount of deviation between the images from combinations of the ROI images generated in Step 1. The process in Step 2 is performed using the registration model 130. A feature map FM(A) of the ROI(A) is generated by inputting the ROI(A) to the first neural network NN1. Similarly, a feature map FM(B) of the ROI(B) and a feature map FM(C) of the ROI(C) are generated by inputting the ROI(B) and the ROI(C) to the first neural network NN1, respectively.

A combination of the feature map FM(A) and the feature map FM(B) generated by the first neural network NN1 is input to the second neural network NN2, and a deformation vector field between the images of the ROI(A) and the ROI(B), here, a deformation vector (dxB, dyB, dzB) indicating the amount of deviation therebetween is obtained as the operation result of the second neural network NN2.

Similarly, a combination of the feature map FM(A) and the feature map FM(C) generated by the first neural network NN1 is input to the second neural network NN2, and a deformation vector (dxC, dyC, dzC) indicating the amount of deviation between the images of the ROI(A) and the ROI(C) is obtained as the operation result of the second neural network NN2. This makes it possible to calculate the amount of deviation between the images from a plurality of ROI images.

The image processing device 220 can perform various optional processes using the amount of deviation calculated using the registration model 103. For example, in Step 3 illustrated in FIG. 8, a corresponding point which corresponds to the point of interest is calculated using the amount of deviation, and the images are displayed with the positions of the point of interest and the corresponding point aligned with each other. As a display aspect, for example, the images are displayed such that the point of interest or the corresponding point of each image to be aligned with the center of a window in which each image is displayed.

The image processing device 220 can calculate a corresponding point CP(B) to the point of interest in the image B on the basis of the deformation vector indicating the amount of deviation between the images of the ROI(A) and the ROI(B), display the image A such that the point of interest is aligned with the center of a display window of the image A, and display the image B such that the corresponding point CP(B) is aligned with the center of a display window of the image B. Similarly, the image processing device 220 can calculate a corresponding point CP(C) to the point of interest in the image C on the basis of the deformation vector indicating the amount of deviation between the images of the ROI(A) and the ROI(C) and display the image C such that the corresponding point CP(C) is aligned with the center of a display window of the image C.

The image processing device 220 may perform a process of displaying an annotation indicating the position of the corresponding point on each image as illustrated in FIG. 8, instead of the process of displaying the images with the positions of the point of interest and the corresponding point aligned with each other as described above.

For example, the image processing device 220 can calculate the corresponding point CP(B) to the point of interest in the image B on the basis of the deformation vector indicating the amount of deviation between the images of the ROI(A) and the ROI(B) and display information indicating a position, such as a mark indicating the corresponding point CP(B), to be superimposed on the image B. Further, the image processing device 220 can calculate the corresponding point CP(C) of the point of interest in the image C on the basis of the deformation vector indicating the amount of deviation between the images of the ROI(A) and the ROI(C) and display information indicating a position, such as a mark indicating the corresponding point CP(C), to be superimposed on the image C. This process of calculating and displaying the corresponding point is performed using the corresponding point calculation program 340.

In addition, the image processing device 220 may perform a process of performing image analysis on the regions of interest (ROI) of a plurality of images, whose positions have been aligned using the amount of deviation, and outputting property findings indicating contrast effects as Step 4, instead of the process in Step 3 or in addition to the process in Step 3. The property findings may include classifications of contrast effects related to a plurality of time phases, such as early enhancement and washout. The image processing device 220 may be configured to perform image analysis using a trained model that has been trained by machine learning to output the classifications of the property findings from the input images of a plurality of time phases. This property analysis process is performed using the property analysis program 350.

FIG. 9 is a flowchart illustrating an ROI registration process in the dynamic contrast CT examination of the liver illustrated in FIG. 8. In Step S101, the processor 302 of the image processing device 220 receives the designation of the point of interest in an image of any time phase in an image group of a plurality of time phases.

In a case in which the point of interest is designated, in Step S102, the processor 302 sets a temporary corresponding point in images other than the reference image, in which the point of interest has been designated, and cuts out the periphery of the point of interest or the temporary corresponding point as the ROI image from each image.

Then, in Step S103, the processor 302 calculates the amount of deviation from a combination of the ROI images using the registration model 103.

Then, in Step S104, the processor 302 calculates a corresponding point which corresponds to the point of interest for the images other than the reference image using the calculated amount of deviation and displays the images with the positions of the point of interest and the corresponding point aligned with each other. In addition, the processor 302 may display information indicating the position of the corresponding point together with the image. After Step S104, the processor 302 ends the flowchart illustrated in FIG. 9. Further, the processor 302 may return to Step S101 after Step S104 and repeatedly perform Steps S101 to S104 in response to the input of the designation of the point of interest.

Figure 10:
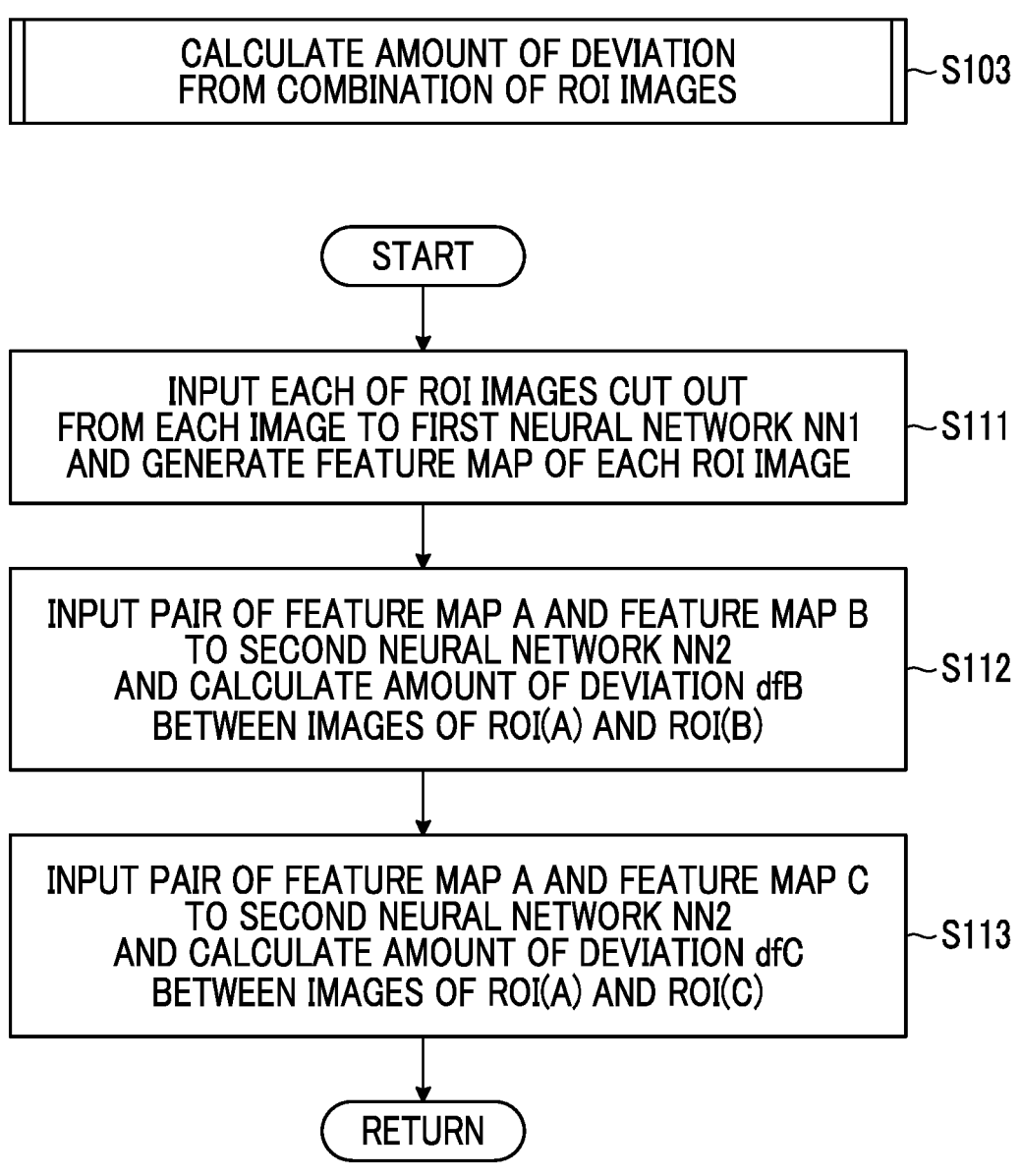
FIG. 10 is a flowchart illustrating an example of a subroutine applied to Step S103 of FIG. 9.

FIG. 10 is a flowchart illustrating an example of a subroutine applied to Step S103 of FIG. 9. In Step S111, the processor 302 inputs each of the ROI images cut out from each of the images of the plurality of time phases to the first neural network NN1 to generate a feature map of each ROI image.

In Step S112, the processor 302 inputs a pair of the feature map FM(A) generated from the ROI(A) and the feature map FM(B) generated from the ROI(B) to the second neural network NN2 to calculate an amount of deviation dfB between the images of the ROI(A) and the ROI(B).

Similarly, in Step S113, the processor 302 inputs a pair of the feature map FM(A) generated from the ROI(A) and the feature map FM(C) generated from the ROI(C) to the second neural network NN2 to calculate an amount of deviation dfC between the images of the ROI(A) and the ROI(C). In a case in which the image D is included, similarly, the processor 302 inputs a pair of the feature map FM(A) generated from the ROI(A) and a feature map FM(D) generated from an ROI(D) to the second neural network NN2 to calculate an amount of deviation dfD between the images of the ROI(A) and the ROI(D), which is not illustrated in FIG. 10.

After Step S113, the processor 302 ends the flowchart of FIG. 10 and returns to the flowchart of FIG. 9.

Property Analysis of Liver Tumor and Generation of Opinion Letter

The image processing device 220 may perform a process of comparing a plurality of images for the region of interest to analyze the properties of the contrast effects, generating an opinion letter to be written in an interpretation report on the basis of the analysis result, and presenting the opinion letter as a further optional process (Step 4) that can be performed by the image processing device 220. For example, the technique disclosed in WO2020/209382A can be applied as a technique for generating an opinion letter from a plurality of findings indicating the properties (features) of the region of interest.

According to the image processing device 220, in a case in which the position of a tumor is designated (clicked) on, for example, an image of an arterial phase in the images of a plurality of time phases and the ROI is cut out with reference to the designated position of the tumor, the images of each time phase are registered, and property analysis for the designated tumor is performed on the basis of the ROI images of the plurality of time phases. As a result of the property analysis based on the image analysis, for example, the following analysis results are obtained: "border: clear"; "margin: smooth"; "early enhancement: +"; "washout: +"; "contrast effect: non-uniform"; "delay: –"; "peripheral enhancement: –"; "ring shape: –"; "capsule formation: +"; "fatty degeneration: +"; "spot: S8"; and "size: 42 mm".

The opinion letter generation program selects information to be written to the interpretation report from information of the analysis results obtained by the property analysis and automatically generates an opinion letter candidate. The image processing device 220, into which the opinion letter generation program has been incorporated, can generate an opinion letter saying that "A clear tumor that has a smooth margin and a size of 42 mm is observed at S8. Heterogeneous early enhancement is observed, accompanied by washout. A capsule-like structure is also seen. A fatty component is also observed." The process of generating the opinion letter is achieved, for example, by using a machine learning model using a neural network architecture represented by a transformer.

Example of Learning Method for Generating Registration Model

Figure 11:
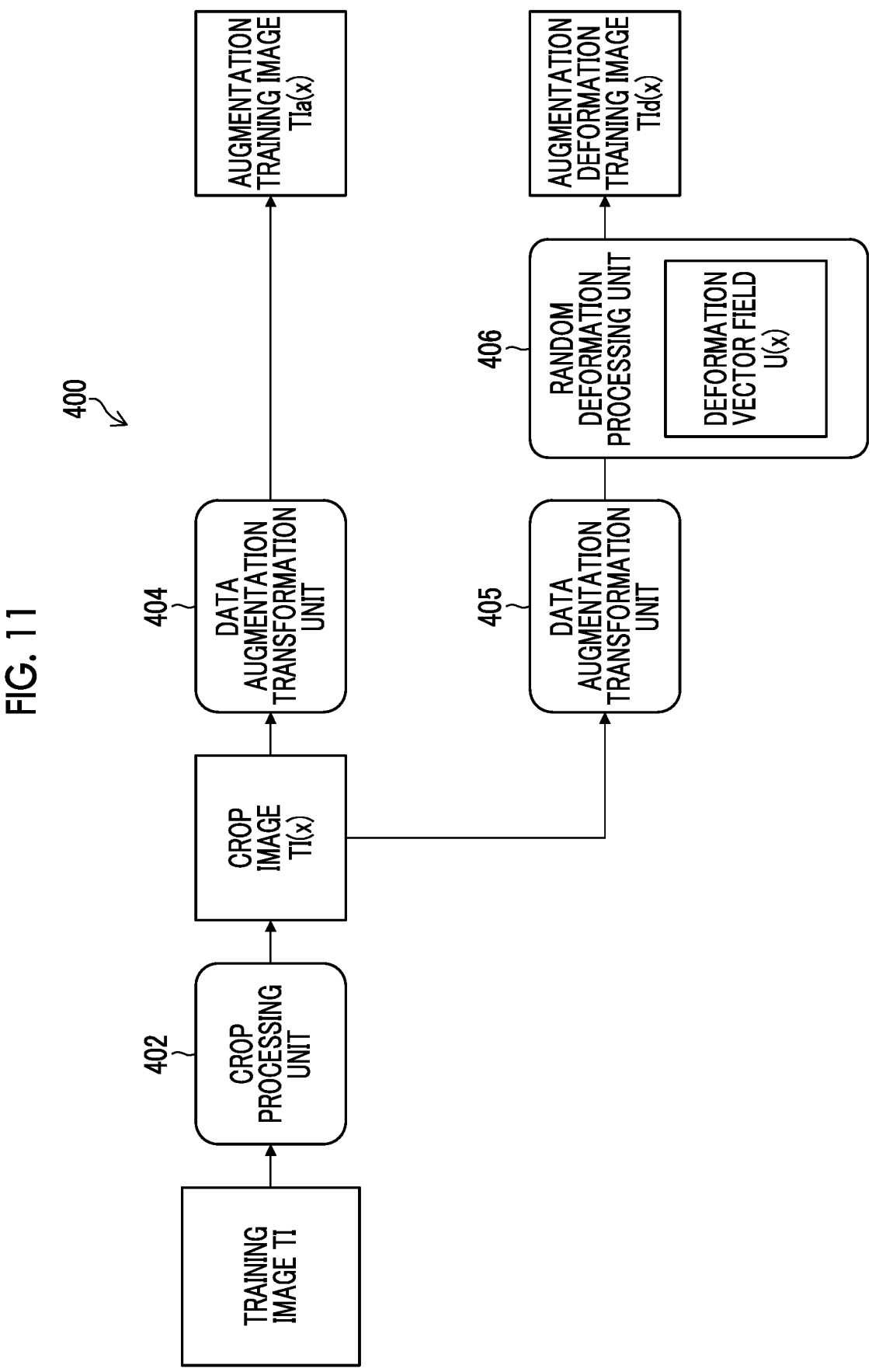
FIG. 11 is a diagram illustrating an outline of a learning method by a machine learning device for generating a registration model and illustrates a configuration of a processing unit that generates training data.
Figure 12:
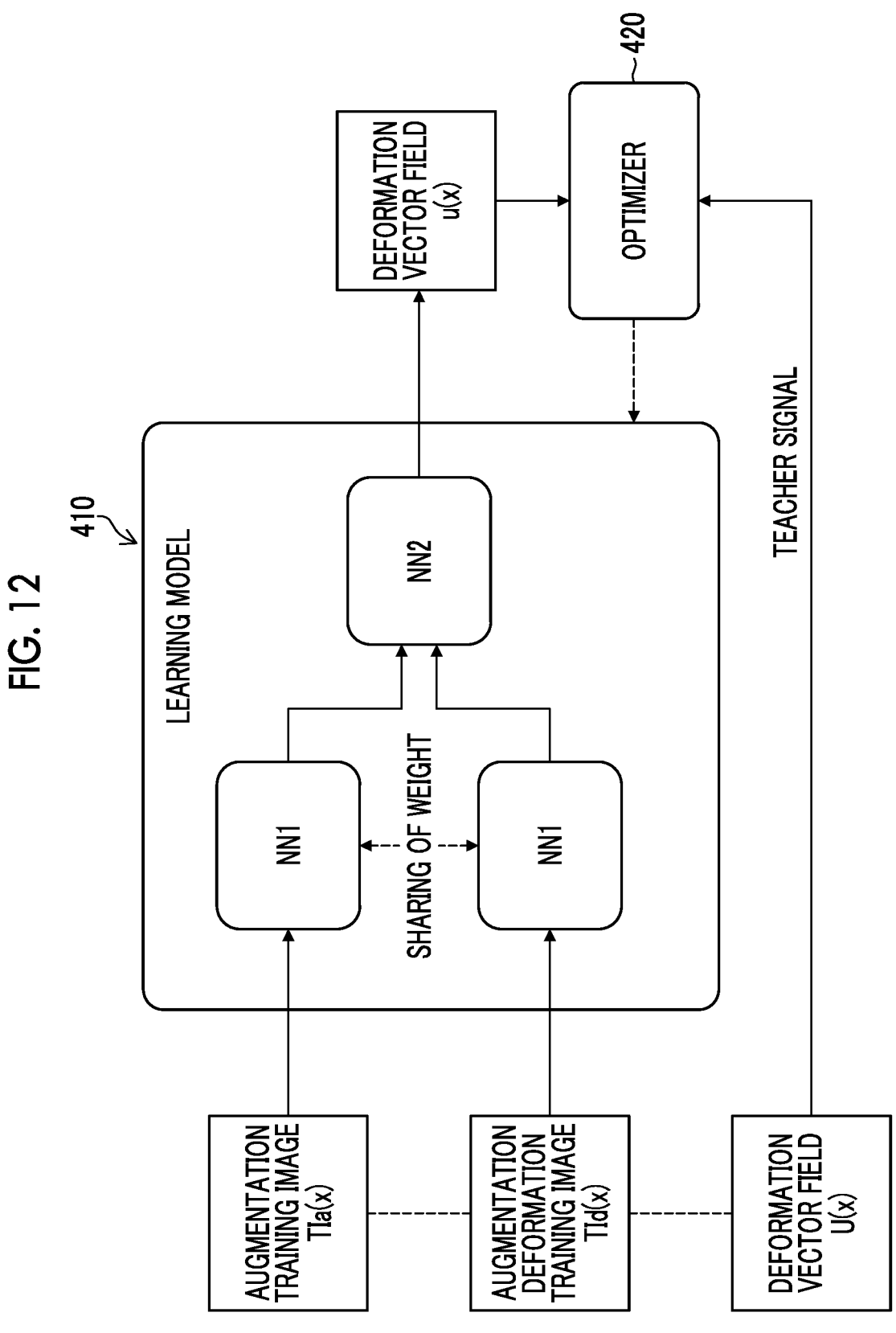
FIG. 12 is a diagram illustrating the outline of the learning method by the machine learning device for generating the registration model and illustrates a configuration of a processing unit that trains a learning model using training data.

Here, an example of a learning method for generating a registration model 132 will be described. FIGS. 11 and 12 illustrate an outline of a learning method using a machine learning device 400 that is applied to this embodiment. FIG. 11 illustrates a configuration of a processing unit (hereinafter, referred to as a training data generation unit) that generates training data, and FIG. 12 illustrates a configuration of a processing unit (hereinafter, referred to as a learning processing unit) that trains a learning model using the generated training data. The term "training" is synonymous with learning.

In general, in the case of the images of a plurality of time phases actually captured by a modality, such as the CT apparatus 204, a ground truth deformation vector field between two images having different contrast states is not specified, and it is difficult to calculate the ground truth deformation vector field between two images to be contrasted. For this reason, it is difficult to prepare a large amount of training data required for machine learning using only the actual images.

Therefore, in the method for training the registration model 130 according to this embodiment, a pair of training images is artificially generated on the basis of the actually captured images, and a deformation vector field that defines deformable transformation used to generate the pair is used as a ground truth teacher signal. A method similar to the method disclosed in K. A. J. Eppenhof and J. P. W. Pluim. "Pulmonary CT Registration through Supervised Learning with Convolutional Neural Networks." IEEE Transactions on Medical Imaging, 38(5):1097-1105, 2019.ISSN 0278-0062. doi: 10.1109/Tmi.2018.2878316. can be applied as a data augmentation method.

As illustrated in FIG. 11, a training data generation unit in the machine learning device 400 includes a crop processing unit 402, data augmentation transformation units 404 and 405, and a random deformation processing unit 406. The machine learning device 400 can be implemented by a combination of hardware and software of a computer.

The crop processing unit 402 performs a process of cutting out a partial image region from an original training image TI, which is a three-dimensional image actually captured, and resizing the image region to a predetermined size. The cut-out position by the crop processing unit 402 may be changed at random. The data augmentation transformation unit 404 applies known deformable transformation to a crop image TI(x) cut out by the crop processing unit 402 to perform image transformation for data augmentation, thereby generating an artificial augmentation training image TIa(x).

The data augmentation transformation unit 405 applies the same transformation function as the data augmentation transformation unit 404 to perform image transformation. In FIG. 11, the data augmentation transformation unit 404 and the data augmentation transformation unit 405 are illustrated as separate processing units. However, the data augmentation transformation unit 404 and the data augmentation transformation unit 405 are the same, and the augmentation training image TIa(x) generated by the data augmentation transformation unit 404 may be input to the random deformation processing unit 406.

The random deformation processing unit 406 performs image deformation using a deformation vector field U(x) that is randomly generated within a predetermined constraint range. Here, the "constraint range" includes, for example, numerical ranges of various deformation parameters, such as a type of algorithm applied to deformation, an amount of deformation, and a range of a region to be deformed. The random deformation processing unit 406 artificially deforms the augmentation training image TIa(x) generated by the data augmentation transformation unit 404 using the deformation vector field U(x) to generate an augmentation deformation training image TId(x). Three-dimensional random deformation performed by the random deformation processing unit 406 may be a combination of rigid deformation and non-rigid deformation. The deformation vector field U(x) that defines deformation in the random deformation processing unit 406 is an example of a "deformation field" in the present disclosure. In addition, in FIG. 11, the data augmentation transformation unit 405 and the random deformation processing unit 406 are separately illustrated. However, the processes of the data augmentation transformation unit 405 and the random deformation processing unit 406 are collectively configured as a transformation processing unit that collectively performs the data augmentation transformation and the random deformation.

In this way, it is possible to generate training data including a pair of the augmentation training image TIa(x) and the augmentation deformation training image TId(x) and the ground truth deformation vector field U(x) between these images from one training image TI. The combinations of the cut-out position by the crop processing unit 402, the transformation function applied to the data augmentation transformation units 404 and 405, and the deformation vector field U(x) applied to the random deformation processing unit 406 can be changed to generate a plurality of training data items from one training image TI. A learning image set including a plurality of training images TI can be prepared, and the process illustrated in FIG. 11 can be applied to each training image TI to obtain a data set including a large number of training data items necessary for machine learning.

In addition, the following aspects are possible: an aspect in which the crop processing unit 402 illustrated in FIG. 11 is omitted; an aspect in which the data augmentation transformation units 404 and 405 are omitted; and an aspect in which the crop processing units 402 and the data augmentation transformation units 404 and 405 are omitted. In any aspect, the process of the random deformation processing unit 406 can be applied to the training image TI to obtain a pair of an image before deformation and an image after deformation.

The machine learning device 400 may generate training data in an on-the-fly method during a training process or may generate training data in advance before the training process and prepare a data set necessary for training.

As illustrated in FIG. 12, the machine learning device 400 includes a learning model 410 and an optimizer 420. In a case in which the registration model 130 is generated, the network structure of the learning model 410 has the same configuration as the network structure described with reference to FIG. 5.

Each of the augmentation training image TIa(x) and the augmentation deformation training image TId(x) is input to the first neural network NN1 of the learning model 410, and each feature map is input to the second neural network NN2. Then, a deformation vector field u(x) is output from the second neural network NN2. In the case of the learning model 410 having the network structure described with reference to FIG. 5, the representation of the deformation vector field u(x) is a space of 1×1×1.

The optimizer 420 determines the amount of update of parameters of the learning model 410 on the basis of the calculation result of loss indicating an error between the output of the learning model 410 and a teacher signal such that the deformation vector field u(x) output by the learning model 410 approaches the ground truth deformation vector field U(x), and performs a process of updating the parameters of the learning model 410. The optimizer 420 updates the parameters on the basis of an algorithm such as a gradient descent method. In addition, the parameters of the learning model 410 include, for example, a filter coefficient (a weight for the coupling between nodes) of a filter used for processing each layer of the neural network and the bias of the nodes. The machine learning device 400 may perform the acquisition of data and the update of the parameters in units of mini-batches in which a plurality of training data items are collected.

A learning process is performed using a large number of training data items in this way to optimize the parameters of the learning model 410 and to generate the registration model 130 having the desired performance.

Figure 13:
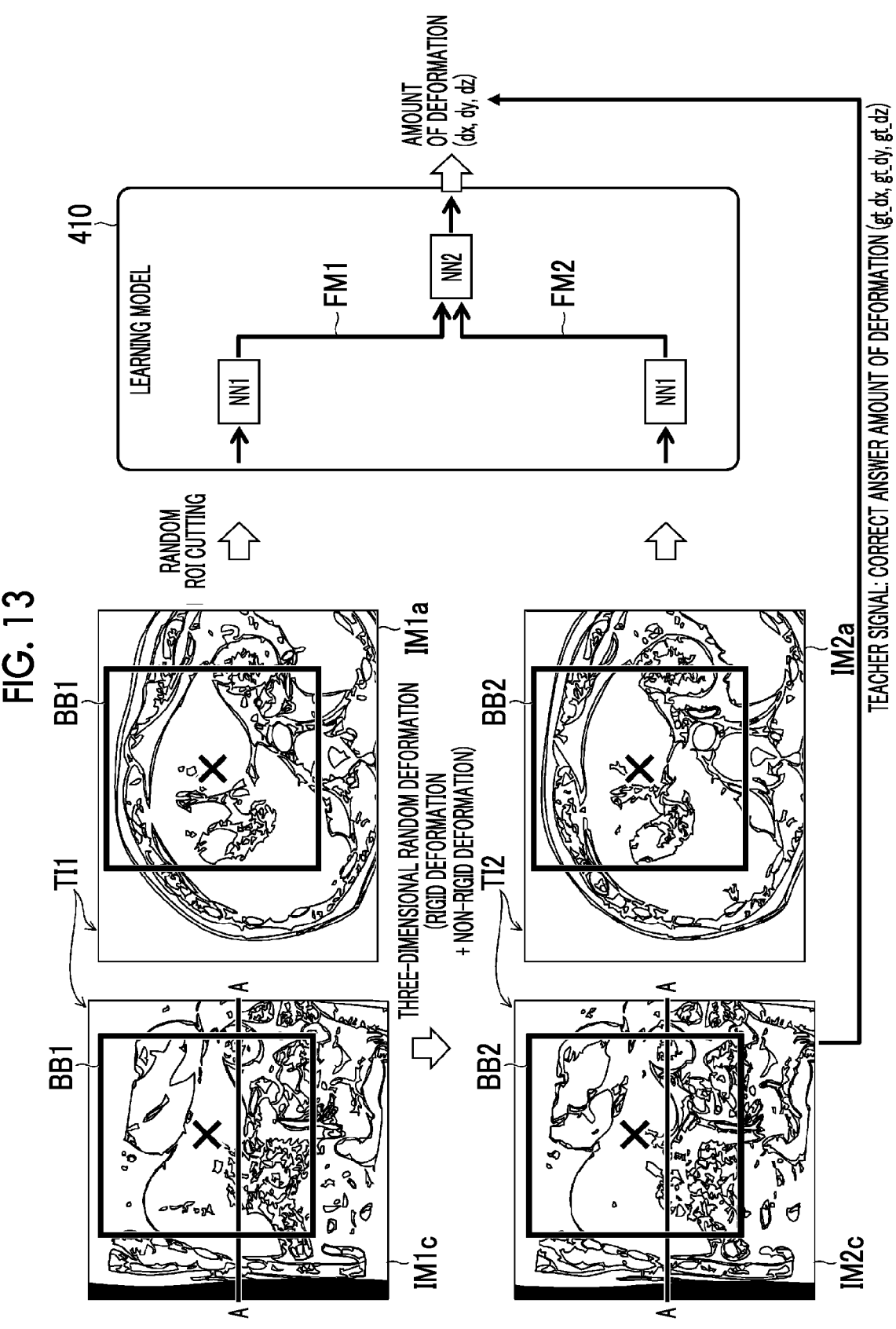
FIG. 13 is a diagram schematically illustrating a learning phase of the registration model illustrated in FIG. 8.

FIG. 13 is a diagram schematically illustrating a learning phase of the registration model 130. An image IM1c and an image IM1a illustrated on the upper left side of FIG. 13 show a cross section of an image TI1 which is a three-dimensional training image. The image IM1c is a coronal image, and the image IM1a is an image (axial image) of a cross section taken along the line A-A of the image IM1c. A rectangular frame BB1 illustrated in the image IM1a and the image IM1c indicates a ROI that is randomly cut out from the training image TI1. An "x" mark shown in the image IM1a and the image IM1c indicates a position corresponding to the point of interest.

Three-dimensional random deformation is performed on the training image TI1 to generate a training image TI2. An image IM2c and an image IM2a illustrated on the lower left side of FIG. 13 are the training image TI2. The image IM2c is a coronal image, and the image IM2a is an axial image. The image IM2a is an image of a cross section taken along the line A-A of the image IM2c. A rectangular frame BB2 shown in the image IM2a and the image IM2c indicates an ROI that is cut out from the image TI2. The position of the rectangular frame BB2 corresponds to the position of the rectangular frame BB1.

The ROIs randomly cut out from each of the image TI1 and the image TI2 are input to the first neural network NN1 of the learning model 410, and the process of the first neural network NN1 is performed on each ROI. An output of the first neural network NN1 that processes each ROI is connected to an input of the second neural network NN2. A combination of feature maps FM1 and FM2 of each ROI is input to the second neural network NN2. Then, a vector (dx, dy, dz) indicating the amount of three-dimensional deformation (amount of deviation) between the ROIs is output from the second neural network NN2.

The parameters of the learning model 410 are updated on the basis of the difference between the amount of deformation output from the learning model 410 and the ground truth amount of deformation (gt_dx, gt_dy, gt_dy) which is a teacher signal. In addition, the ground truth amount of deformation (gt_dx, gt_dy, gt_dy) can be calculated from a deformation vector field corresponding to a transformation function applied to the three-dimensional random deformation process.

Application Example 2

The technique for the registration between the images according to the present disclosure is not limited to the registration between the images of a plurality of time phases in the dynamic contrast examination, but can also be applied to various purposes.

Figure 14:
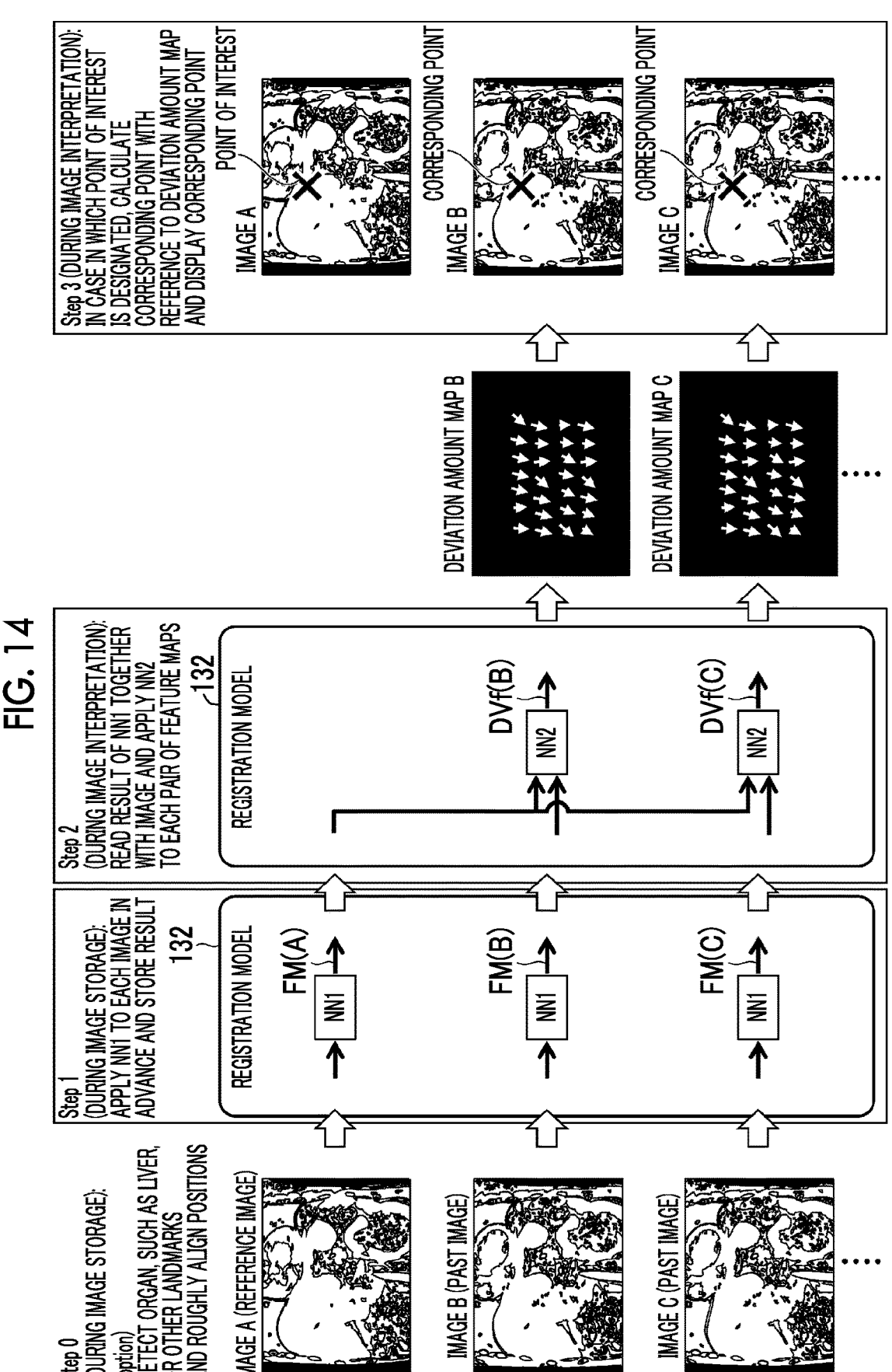
FIG. 14 is a diagram illustrating an outline of Application Example 2 of the image processing using the image processing device.

FIG. 14 is a diagram illustrating an outline of Application Example 2 of the image processing using the image processing device 220. FIG. 14 illustrates an example of a registration process for comparing liver examination images over time. Here, an example in which a registration model 132 having the same network structure as the registration model 101 (see FIG. 2) described in the first embodiment is used will be described. The registration model 132 may have the same network structure as the registration model 102 (see FIG. 4) described in the second embodiment.

In a case in which a liver CT examination is performed on a certain patient, images captured by the CT apparatus 104 are stored in the image storage server 210. In some cases, an examination is performed a plurality of times on the same patient on different examination days (times), and a plurality of examination images captured on different examination days are compared to observe a change in state. As one of the methods useful for this comparison over time, in a case in which an examination image is stored, the first neural network NN1 of the registration model 132 may be used to generate a feature map of the examination image, and the feature map of the examination image may be stored in the image storage server 210 together with the examination image. Hereinafter, the procedure of the process by the image processing device 220 will be described with specific examples.

In Step 0, the image processing device 220 detects, for example, an organ, such as the liver, or other landmarks from the images obtained by performing an examination, and the positions of the images are roughly aligned with each other. An image A illustrated on the leftmost side of FIG. 14 is the latest image obtained by the current examination and indicates the current state of the patient. In this example, this latest image A serves as a reference image for registration. An image B and an image C illustrated below the image A indicate images of the same patient captured in the past and have different imaging times (examination days). The images A, B, and C illustrated in FIG. 14 are examples of "images captured on different days" in the present disclosure. In addition, one or more past images, such as an image D, may be included, which is not illustrated in FIG. 14.

The process in Step 0 is preferably performed as preprocessing of the next Step 1. However, the process is not an essential process and is an optional process that can be selected whether or not it is performed.

In Step 1, the image processing device 220 applies the first neural network NN1 to each of the images obtained by performing the examination to generate feature maps as processing results of the first neural network NN1 and store each of the feature maps in the image storage server 210 to be associated with the images. In FIG. 14, the processes of applying the first neural network NN1 to each of the image A, the image B, and the image C are illustrated in parallel. However, these processes are performed at the timing when each image is acquired by the examination, and the timings of the processes are different.

Then, during image interpretation, the image processing device 220 reads the images to be compared and the feature maps which are the processing results of the first neural network NN1 for the images from the image storage server 210 and applies the second neural network NN2 to a pair of the feature maps of the two images to be compared. A pair of a feature map FM(A) of the image A and a feature map FM(B) of the image B is input to the second neural network NN2. Then, the second neural network NN2 outputs a deformation vector field DVf(B) corresponding to a deviation amount map B between the image A and the image B.

Further, a pair of the feature map FM(A) of the image A and a feature map FM(C) of the image C is input to the second neural network NN2. Then, the second neural network NN2 outputs a deformation vector field DVf(C) corresponding to a deviation amount map C between the image A and the image C.

The image processing device 220 can perform various optional processes using the deviation amount map calculated by the registration model 132. For example, as illustrated in FIG. 14, in Step 3, the image processing device 220 receives the designation of the point of interest during image interpretation. In a case in which the point of interest is designated, the image processing device 220 performs a process of calculating a corresponding point which corresponds to the point of interest for each of the past images with reference to the deviation amount map and displaying the images such that the positions of the point of interest and the corresponding point are aligned with each other. For example, the images are displayed such that the point of interest or the corresponding point of each image is aligned with the center of the window in which each of the current image and the past image is displayed. In addition, as illustrated in FIG. 14, information (annotation) indicating the position of the corresponding point may be displayed together with the past image.

Figure 15:
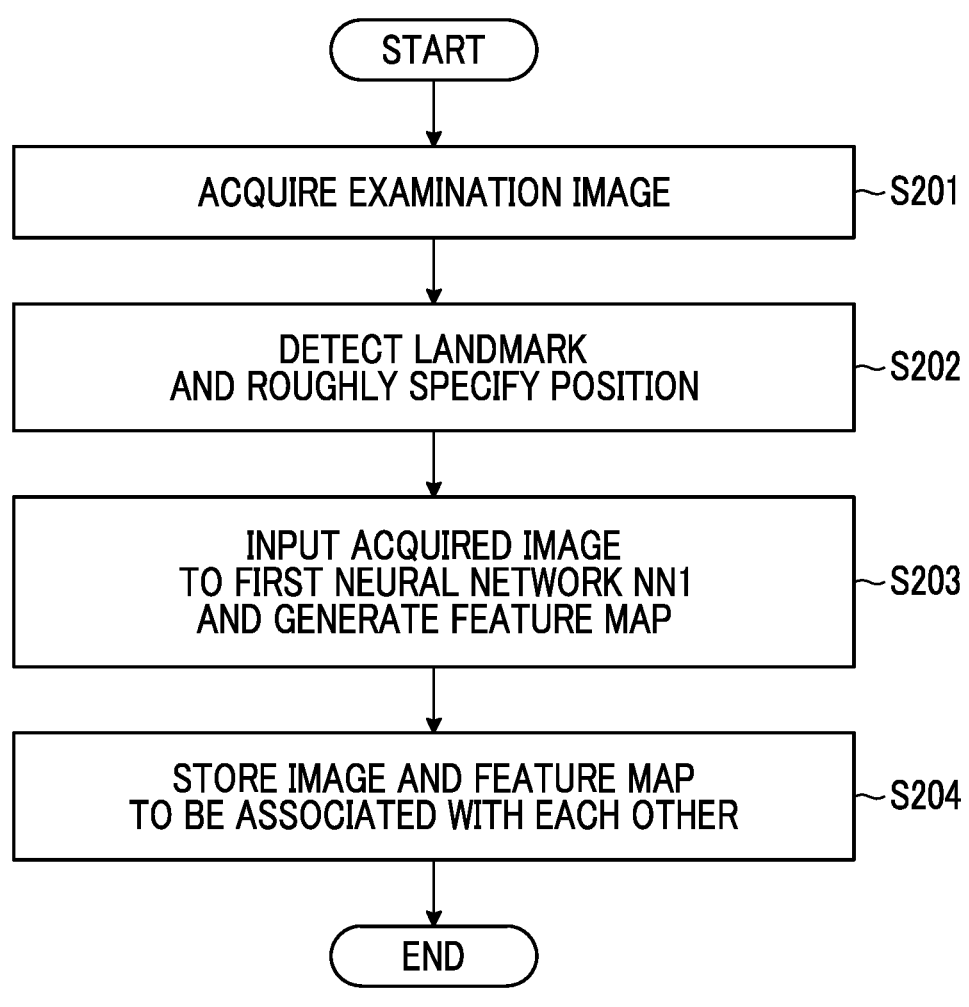
FIG. 15 is a flowchart illustrating a registration process applied to comparison over time illustrated in FIG. 14 and illustrates an example of a process during image storage.

FIGS. 15 and 16 are flowcharts illustrating the registration process applied to the comparison over time illustrated in FIG. 14. FIG. 15 is a flowchart illustrating an example of a process during image storage, and FIG. 16 is a flowchart illustrating an example of a process during image interpretation.

In Step S201 of FIG. 15, the processor 302 of the image processing device 220 acquires an examination image. The processor 302 may acquire the latest examination image from a modality, such as the CT apparatus 104, or may acquire the examination image from the image storage server 210.

In Step S202, the processor 302 detects an organ, such as the liver, or other landmarks from the acquired image and specifies the rough position of the region of interest including the region to be observed on the basis of the information of the detected landmark.

Then, in Step S203, the processor 302 inputs the acquired image to the first neural network NN1 to generate a feature map. Then, in Step S204, the processor 302 stores the acquired image and the feature map as the processing result of the first neural network NN1 in the image storage server 210 to be associated with each other. After Step S204, the processor 302 ends the flowchart illustrated in FIG. 15.

Whenever a new examination image is captured by performing the examination, the flowchart illustrated in FIG. 15 is executed, and the processing result of the first neural network NN1 is stored in advance for each examination image to be associated with the examination image.

In a case in which image interpretation is performed, the flowchart illustrated in FIG. 16 is executed. In Step S211, the processor 302 of the image processing device 220 reads a target image and the feature map thereof from the image storage server 210 in response to an instruction from the viewer terminal 230. Then, in Step S212, the processor 302 inputs each pair of the feature maps of a plurality of images to be compared to the second neural network NN2.

In Step S213, the processor 302 performs a process using the second neural network NN2 to generate a deviation amount map (that is, a deformation vector field) between the images. The generated deviation amount map between images may be stored in the image processing device 220 or may be stored in the image storage server 210.

In Step S214, the processor 302 receives the designation of the point of interest. In a case in which the designation of the point of interest is input from the viewer terminal 230, designation information is transmitted to the processor 302.

In a case in which the point of interest is designated, in Step S215, the processor 302 calculates a corresponding point which corresponds to the point of interest in the past image with reference to the deviation amount map and displays the images such that the positions of the point of interest and the corresponding point are aligned with each other. The processor 302 may display information indicating the position of the corresponding point together with the past image.

After Step S215, the processor 302 ends the flowchart illustrated in FIG. 16. In addition, the processor 302 may return to Step S211 after Step S215 and repeatedly perform Steps S211 to S215 in response to the input of the designation of the point of interest.

As described with reference to FIGS. 14 to 16, the process using the first neural network NN1 and the process using the second neural network NN2 in the registration model 132 may be performed at different times. The first neural network NN1 and the second neural network NN2 can be configured as individual processing modules that can perform calculation separately. Further, a system may be used in which a device performing the process using the first neural network NN1 and a device performing the process using the second neural network NN2 are configured as separate devices.

Example of Learning Method for Generating Registration Model 132

Figure 17:
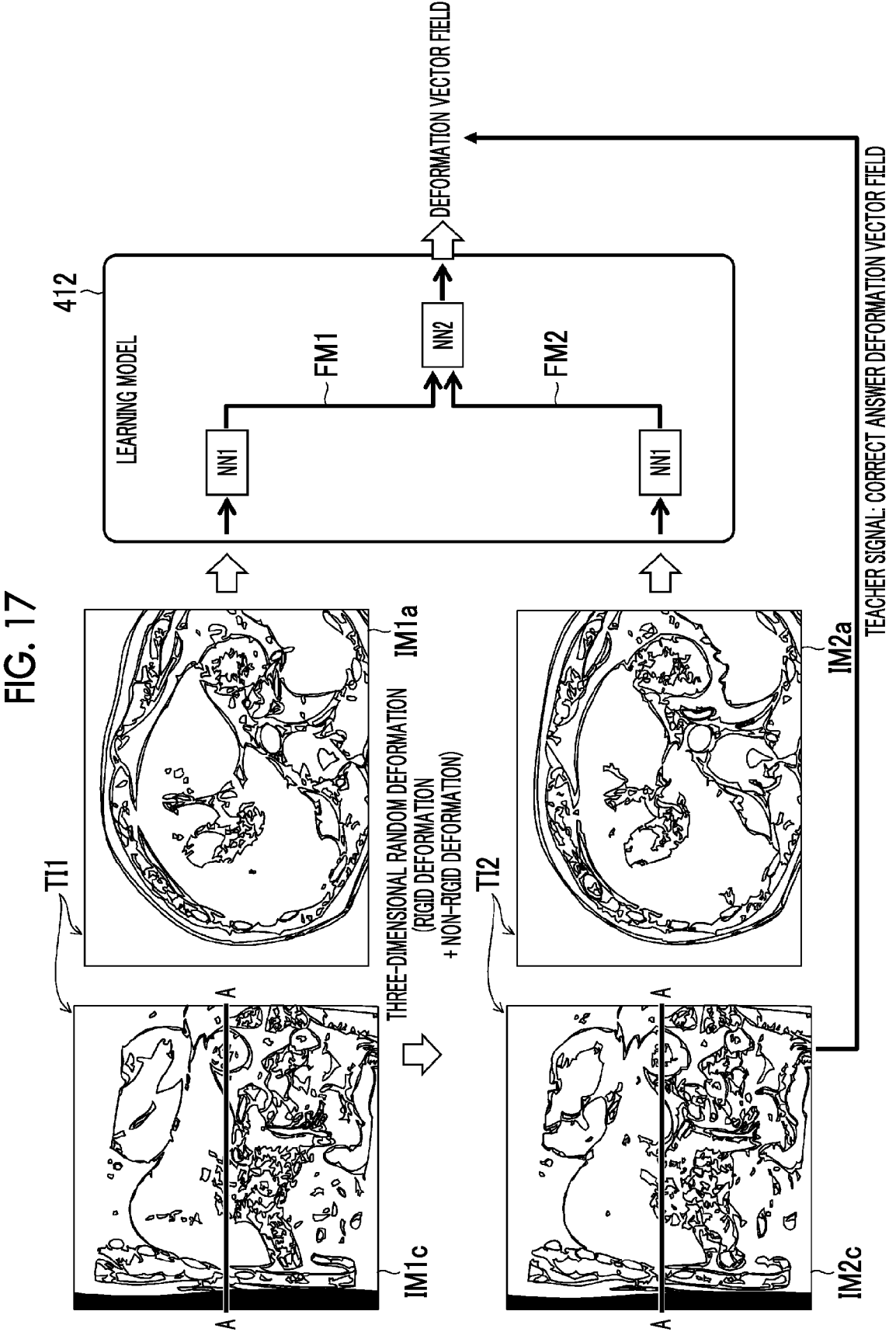
FIG. 17 is a diagram schematically illustrating a learning phase of the registration model applied to the comparison over time illustrated in FIG. 16.

FIG. 17 is a diagram schematically illustrating a learning phase of the registration model 132 applied to the comparison over time illustrated in FIG. 16. In FIG. 17, the same elements as those in FIG. 13 are denoted by the same reference numerals, and the description thereof will not be repeated. The network structure of a learning model 412 in a case in which the registration model 132 is generated is the network structure illustrated in FIG. 2 or FIG. 4.

Three-dimensional random deformation is performed on the training image TI1 to generate the training image TI2. Each of the training images TI1 and TI2 is input to the first neural network NN1 of the learning model 412, and the process of the first neural network NN1 is performed on each image. The output of the first neural network NN1 that processes each image is connected to the input of the second neural network NN2, and a combination of the feature maps FM1 and FM2 generated from each image is input to the second neural network NN2. Then, the second neural network NN2 outputs a deformation vector field between the images.

Parameters of the learning model 412 are updated on the basis of the difference between the deformation vector field output from the learning model 412 and a ground truth deformation vector field which is a teacher signal. In addition, the ground truth deformation vector field is a deformation vector field corresponding to a deformable transformation function applied to a three-dimensional random deformation process.

Application Example 3

Figure 18:
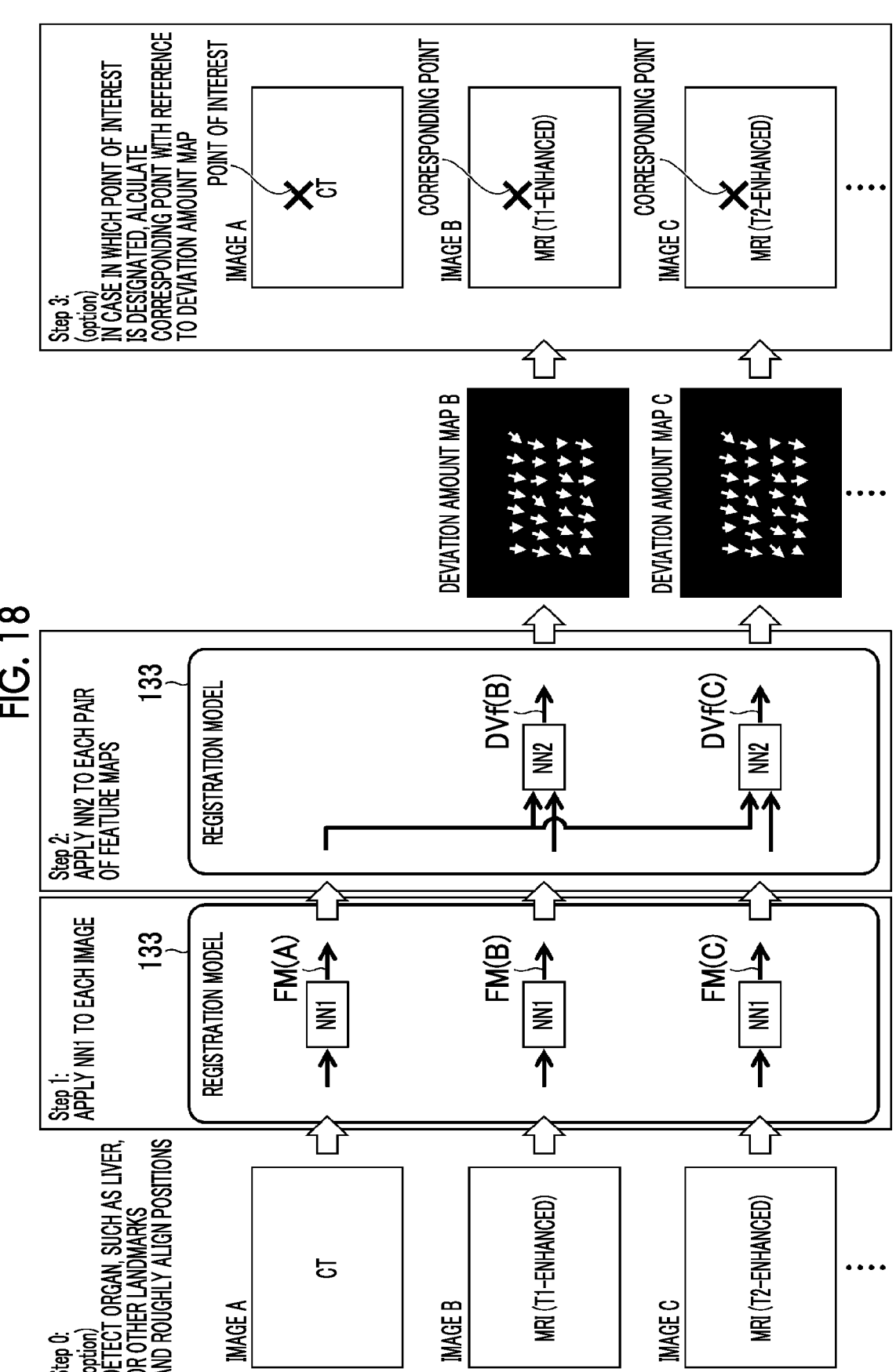
FIG. 18 is a diagram illustrating an outline of Application Example 3 of the image processing using the image processing device.

FIG. 18 is a diagram illustrating an outline of Application Example 3 of the image processing using the image processing device 220. The technique for the registration between the images according to the present disclosure can be applied to comparison between images of different modalities. FIG. 18 illustrates an example of a registration process for comparing the images of different modalities. Here, an example in which a registration model 133 having the same network structure as the registration model 101 (see FIG. 2) described in the first embodiment is used will be described. However, the registration model 133 may have the same network structure as the registration model 102 (see FIG. 4) described in the second embodiment. In FIG. 18, the mechanism of the process of the comparison over time described with reference to FIG. 17 is applied to the comparison between the images of different modalities.

An image A to be processed which is illustrated in FIG. 18 may be, for example, a CT image, an image B to be processed may be a T1-enhanced image captured by the MRI apparatus 206, and an image C to be processed may be, for example, a T2-enhanced image. The images A, B, and C of different modalities are images of the same patient, and the imaging times (examination days) of the images may be the same examination day or may be different examination days. The images A, B, and C illustrated in FIG. 18 are examples of "images of different modalities" in the present disclosure. One or more other modality images, such as the image D, may be further included, which is not illustrated in FIG. 18.

In Step 0, the image processing device 220 detects, for example, an organ, such as the liver, or other landmarks from the images obtained by performing an examination, and the positions of the images are roughly aligned with each other.

In Step 1, the image processing device 220 applies the first neural network NN1 of the registration model 133 to each image to generate feature maps as the processing results of the first neural network NN1.

The processes in Step 0 and Step 1 may be performed during image storage or during image interpretation as in the example illustrated in FIG. 14.

After Step 1, the image processing device 220 applies the second neural network NN2 to each pair of the feature maps of two images to be compared. A pair of a feature map FM(A) of the image A and a feature map FM(B) of the image B is input to the second neural network NN2. Then, the second neural network NN2 outputs a deformation vector field DVf(B) corresponding to a deviation amount map B between the image A and the image B.

Further, a pair of the feature map FM(A) of the image A and a feature map FM(C) of the image C is input to the second neural network NN2. Then, the second neural network NN2 outputs a deformation vector field DVf(C) corresponding to a deviation amount map C between the image A and the image C.

The image processing device 220 can perform various optional processes using the deviation amount maps calculated by the registration model 133. For example, as illustrated in FIG. 18, in Step 3, the image processing device 220 performs a process of receiving the designation of the point of interest in a case in which image interpretation is performed, calculating a corresponding point which corresponds to the point of interest for each of the images of different modalities with reference to the deviation amount maps in a case in which the point of interest is designated, and displaying the images such that the positions of the point of interest and the corresponding point are aligned with each other. In addition, the image processing device 220 may perform a process of displaying an annotation indicating the position of the corresponding point on each image.

Example of Learning Method for Generating Registration Model 133

Figure 19:
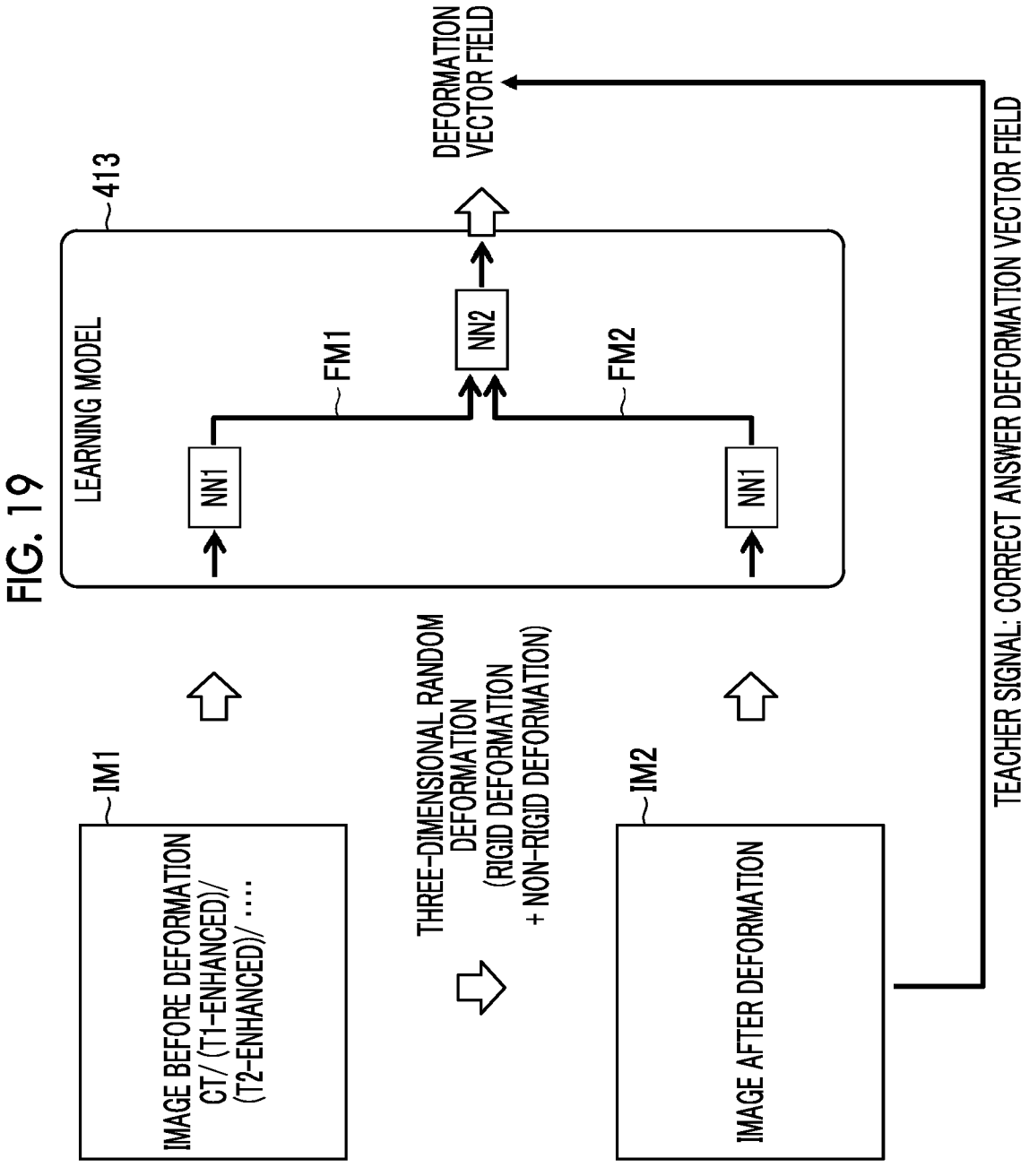
FIG. 19 is a diagram schematically illustrating a learning phase of a registration model applied to comparison between images of modalities illustrated in FIG. 18.

FIG. 19 is a diagram schematically illustrating a learning phase of the registration model 133 applied to the comparison between the images of the modalities illustrated in FIG. 18. A network structure of the learning model 413 in a case in which the registration model 133 is generated is the network structure illustrated in FIG. 2 or FIG. 4.

During learning, a learning image set in which images of a plurality of modalities, such as a CT image, an MRI (T1-enhanced) image, and an MRI (T2-enhanced) image, are mixed is used. An image IM1 illustrated in FIG. 19 is an image selected from the learning image set and is an image before three-dimensional random deformation.

Three-dimensional random deformation is performed on the image IM1 to generate an image IM2 after deformation. The three-dimensional random deformation may be a deformation process in which rigid deformation and non-rigid deformation are combined.

Each of the images IM1 and IM2 obtained in this way input to the first neural network NN1 of the learning model 413, and the process of the first neural network NN1 is performed for each image. A combination of feature maps FM1 and FM2 generated from each image by the first neural network NN1 is input to the second neural network NN2, and the second neural network NN2 outputs a deformation vector field between the images.

Parameters of the learning model 413 are updated on the basis of the difference between the deformation vector field output from the learning model 413 and a ground truth deformation vector field which is a teacher signal. Therefore, the first neural network NN1 is trained to extract features suitable for registration from the input image regardless of the type of image.

For Program for Operating Computer

A program that causes a computer to implement some or all of the processing functions of the image processing device 220 can be recorded on a computer-readable medium which is an optical disk, a magnetic disk, a semiconductor memory, or other tangible non-transitory information storage media. Then, the program can be provided through the information storage medium.

Further, instead of the aspect in which the program is stored in the tangible non-transitory computer-readable medium and then provided, program signals may be provided as a download service using a telecommunication line such as the Internet.

Further, some or all of the processing functions of the image processing device 220 may be implemented by cloud computing or may be provided as a Software as a Service (SasS) service.

For Hardware Configuration of Each Processing Unit

A hardware structure of processing units performing various processes, such as the registration processing unit 110, the feature extraction units 111 and 332, the deformation vector field calculation units 112 and 334 of the image processing device 220 and the crop processing unit 402, the data augmentation transformation units 404 and 405, and the random deformation processing unit 406 of the machine learning device 400, is, for example, the following various processors.

The various processors include, for example, a CPU which is a general-purpose processor executing a program to function as various processing units, a GPU which is a processor specializing in image processing, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process.

One processing unit may be configured by one of the various processors or a combination of two or more processors of the same type or different types. For example, one processing unit may be configured by a plurality of FPGAs, a combination of a CPU and an FPGA, or a combination of a CPU and a GPU. In addition, a plurality of processing units may be configured by one processor. A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As described above, various processing units are configured using one or more of the various processors as a hardware structure.

In addition, specifically, the hardware structure of the various processors is an electric circuit (circuitry) obtained by combining circuit elements such as semiconductor elements.

Advantages of Embodiments of Present Disclosure

According to the aspects described as each of the first to third embodiments and each of Application Examples 1 to 3, the feature map is generated for each image by the first neural network NN1, and a combination of the feature maps of different images is input to the second neural network NN2 to calculate the deformation vector field between the images. Therefore, it is possible to suppress calculation resources (the amount of calculation and/or storage capacity) required for registration between images. In particular, in a case in which one of three or more images is set as the reference image and registration between the reference image and other images is performed, the feature map of the reference image can be used in common for combinations with other images. Therefore, the effect of suppressing the amount of calculation is large.

Other Application Examples

In the above-described embodiments, the medical image has been described as an example. However, the scope of the application of the present disclosure is not limited to the medical image, and the present disclosure can be applied to various images regardless of the purpose. In addition, in the above-described embodiments, the example in which the three-dimensional image is handled has been described. However, the technique of the present disclosure can also be applied to a two-dimensional image. In a case in which the image to be handled is a two-dimensional image, the first neural network NN1 and the second neural network NN2 may adopt a network structure that processes the two-dimensional image.

Others

The present disclosure is not limited to the above-described embodiments, and various modifications can be made without departing from the gist of the technical idea of the present disclosure.

EXPLANATION OF REFERENCES

10, 101, 102, 103: registration model
110: registration processing unit
111: feature extraction unit
112: deformation vector field calculation unit
130, 132, 133: registration model
200: medical information system
202: electronic medical record system
204: CT apparatus
206: MRI apparatus
210: image storage server
212: image database
220: image processing device
222: input device
224: display device
230: viewer terminal
232: input device
234: display device
240: communication line
302: processor
304: computer-readable medium
306: communication interface
308: input/output interface
310: bus
322: memory
324: storage
330: registration processing program
332: feature extraction unit
334: deformation vector field calculation unit
340: corresponding point calculation program
350: property analysis program
360: display control program
400: machine learning device
402: crop processing unit
404, 405: data augmentation transformation unit
406: random deformation processing unit
410, 412, 413: learning model
420: optimizer
NN1: first neural network
NN2: second neural network
BB1, BB2: rectangular frame
ROI(A), ROI(B), ROI(C): ROI image

FM(A), FM(B), FM(C): feature map
CP(B), CP(C): corresponding point
TI: training image
TI(x): crop image
TIa(x): augmentation training image
TId(x): augmentation deformation training image
TI1, TI2: image
**IM1, IM1*a*, IM1*c***: image
**IM2, IM2*a*, IM2*c***: image
FM1, FM2: feature map
DVf(B), DVf(C): deformation vector field
S101 to S104: step of region-of-interest registration process
S111 to S113: step of process of calculating amount of deviation between ROI images
S201 to S204: step of process during image storage
S211 to S215: step of process during image interpretation

What is claimed is:

1. An image processing method that is executed by one or more processors, the image processing method comprising:
   allowing the one or more processors to acquire feature maps of each of a plurality of images, wherein the one or more processors generate the feature maps respectively from the plurality of images using a first neural network that receives a first image of the images and outputs a first feature map of the feature maps with a plurality of weights, and the first neural network also receives a second image of the images and outputs a second feature map of the features maps while sharing the weights;
   allowing the one or more processors to calculate a deformation vector field from a combination of the feature maps of each image, wherein the one or more processors input the combination of the feature maps comprising the first feature map and the second feature map to a second neural network, and calculate the deformation vector field using the second neural network;
   allowing the one or more processors to receive a designation of a point of interest in one of the plurality of images;
   allowing the one or more processors to calculate a corresponding point which corresponds to the point of interest in the other images among the plurality of images on the basis of the calculated deformation vector field; and
   allowing the one or more processors to display the images such that positions of the point of interest and the corresponding point are aligned with each other.

2. The image processing method according to claim 1, wherein the first neural network is a network that receives an input of one image, processes the input one image, and outputs one or more feature maps, and
   the second neural network is a network that receives an input of a pair of feature maps respectively generated from two different images, processes the pair of feature maps, and outputs the deformation vector field between the two different images.

3. The image processing method according to claim 1, wherein the first neural network and the second neural network are trained models that have been subjected to machine learning in advance using a learning image set, and
   a process of the machine learning is performed such that a combination of feature maps of two images obtained by inputting each of the two images to the first neural network is input to the second neural network and the second neural network outputs the deformation vector field.

4. The image processing method according to claim 3, wherein the learning image set includes a plurality of different images, and one of the two images input to the first neural network during the machine learning is an image generated by deforming the other image.

5. The image processing method according to claim 4, wherein a deformation field that defines the deformation is randomly generated within a predetermined constraint range, the deformation field applied to a process of the deformation is set as a ground truth, and learning is performed such that an output of the second neural network approaches the ground truth.

6. The image processing method according to claim 1, wherein each of the plurality of images is a medical image.

7. The image processing method according to claim 1, wherein the plurality of images are images having different contrast states.

8. The image processing method according to claim 7, further comprising:

allowing the one or more processors to analyze the plurality of images registered using the deformation vector field and to output a property finding indicating a contrast effect of a region of interest.

9. The image processing method according to claim 1, wherein the plurality of images are images captured on different days.

10. The image processing method according to claim 1, wherein the plurality of images are images captured by different modalities.

11. The image processing method according to claim 1, wherein the plurality of images are three or more images, and the one or more processors calculate the deformation vector field for each of combinations of a reference image, which is one of the plurality of images, and images other than the reference image from each combination of the feature maps of two images of the reference image and the image other than the reference image.

12. An image processing device comprising:

one or more processors; and one or more memories that store a program to be executed by the one or more processors, wherein the one or more processors execute commands of the program to acquire feature maps of each of a plurality of images, wherein the one or more processors generate the feature maps respectively from the plurality of images using a first neural network that receives a first image of the images and outputs a first feature map of the feature maps with a plurality of weights, and the first neural network also receives a second image of the images and outputs a second feature map of the features maps while sharing the weights, wherein the one or more processors execute the commands of the program to calculate a deformation vector field from a combination of the feature maps of each image, wherein the one or more processors input the combination of the feature maps comprising the first feature map and the second feature map to a second neural network, and calculate the deformation vector field using the second neural network, wherein the one or more processors receive a designation of a point of interest in one of the plurality of images, calculate a corresponding point which corresponds to the point of interest in the other images among the plurality of images on the basis of the calculated deformation vector field, and display the images such that positions of the point of interest and the corresponding point are aligned with each other.

13. A non-transitory, computer-readable tangible recording medium which records thereon, a program that causes, when read by a computer, the computer to implement:

a function of acquiring feature maps of each of a plurality of images, wherein the program further causes the computer to implement:

generating the feature maps respectively from the plurality of images using a first neural network that receives a first image of the images and outputs a first feature map of the feature maps with a plurality of weights, wherein the first neural network also receives a second image of the images and outputs a second feature map of the features maps while sharing the weights; and a function of calculating a deformation vector field from a combination of the feature maps of each image, wherein the program further causes the computer to implement:

inputting the combination of the feature maps comprising the first feature map and the second feature map to a second neural network, and calculating the deformation vector field using the second neural network, wherein the program further causes the computer to implement:

receiving a designation of a point of interest in one of the plurality of images;

calculating a corresponding point which corresponds to the point of interest in the other images among the plurality of images on the basis of the calculated deformation vector field; and displaying the images such that positions of the point of interest and the corresponding point are aligned with each other.

* * * * *